US008660759B2

(12) United States Patent
Hashimoto et al.

(10) Patent No.: US 8,660,759 B2
(45) Date of Patent: Feb. 25, 2014

(54) TRAVELING CRANE OPERATION CONTROL APPARATUS AND METHOD

(75) Inventors: Tsutomu Hashimoto, Yamanashi (JP); Yafang Shi, Yamanashi (JP); Michio Fukasawa, Yamanashi (JP); Shigeru Muramatsu, Yamanashi (JP); Koichi Koizumi, Yamanashi (JP); Shigeo Terai, Yamanashi (JP)

(73) Assignee: Kito Corporation, Nakakoma-gun, Yamanashi (JP)

( * ) Notice: Subject to any disclaimer, the term of this patent is extended or adjusted under 35 U.S.C. 154(b) by 463 days.

(21) Appl. No.: 12/990,727

(22) PCT Filed: Apr. 22, 2009

(86) PCT No.: PCT/JP2009/058026
§ 371 (c)(1),
(2), (4) Date: Nov. 30, 2010

(87) PCT Pub. No.: WO2009/139279
PCT Pub. Date: Nov. 19, 2009

(65) Prior Publication Data

US 2011/0066335 A1 Mar. 17, 2011

(30) Foreign Application Priority Data

May 13, 2008 (JP) ................................ 2008-126024

(51) Int. Cl.
*G06F 19/00* (2011.01)

(52) U.S. Cl.
USPC ............................................................ 701/50

(58) Field of Classification Search
USPC ............................................................ 701/50
See application file for complete search history.

(56) References Cited

U.S. PATENT DOCUMENTS 3,469,164 A * 9/1969 Smith et al. .................. 318/257
5,930,741 A * 7/1999 Kramer ........................ 702/153

(Continued)

FOREIGN PATENT DOCUMENTS

DE 10207880 C1 7/2003
EP 1683753 A1 7/2006

(Continued)

OTHER PUBLICATIONS

International Search Report of PCT/JP2009/058026, mailing date Aug. 4, 2009.

(Continued)

*Primary Examiner* — Thomas B Will
*Assistant Examiner* — Joel F. Mitchell
(74) *Attorney, Agent, or Firm* — Westerman, Hattori, Daniels & Adrian, LLP

(57) ABSTRACT

To provide a traveling crane operation control apparatus and method enabling an operator to operate a traveling crane quickly and accurately by one hand and by a motion of his or her body with a controller worn thereon, without the need to gaze at his or her hand, and also allowing variable-speed control and fine speed control of each drive unit.

An operation control apparatus for a traveling crane has an operation control circuit section 1 including a base unit 2 wearable on an arm 4 of an operator and a control unit 3 operable by a hand. The base unit 2 has base unit tilt detecting means detecting a tilt direction and tilt angle of the base unit 2 in a vertical plane, base unit direction detecting means detecting a direction in which the base unit 2 points in a horizontal plane, and command signal generating means generating a travel command signal and a travel speed command signal for a travel motor, a traverse command signal and a traverse speed command signal for a traverse motor, and an elevation command signal and an elevation speed command signal for an elevation motor. The traveling crane can be controlled to perform travel, traverse, lifting and lowering operations simply by pointing the base unit 2 in a direction in which travel and traverse motions are desired to occur and in a vertical direction in which a lifting or lowering motion is desired to occur, and actuating the control unit 3.

14 Claims, 20 Drawing Sheets

(56) References Cited

U.S. PATENT DOCUMENTS

| | | | | |
|---|---|---|---|---|
| 6,474,922 | B2 * | 11/2002 | Bachman et al. | 414/21 |
| 7,185,774 | B2 * | 3/2007 | Colgate et al. | 212/331 |
| 2003/0164349 | A1 * | 9/2003 | Kohlenberg | 212/284 |
| 2007/0208528 | A1 | 9/2007 | Seo et al. | |

FOREIGN PATENT DOCUMENTS

| | | | |
|---|---|---|---|
| JP | 59-022886 | A | 2/1984 |
| JP | 7-032547 | Y2 | 7/1995 |
| JP | 2005-089051 | A | 4/2005 |
| JP | 2007-039232 | A | 2/2007 |
| JP | 2009-023753 | A | 2/2009 |
| JP | 2009-137750 | A | 6/2009 |

OTHER PUBLICATIONS

German Office Letter dated Nov. 18, 2013, issued in corresponding German Patent Application No. 11 2009 001 162.4 with English translation (11 pages).

* cited by examiner

TRAVELING CRANE OPERATION CONTROL APPARATUS AND METHOD

TECHNICAL FIELD

The present invention relates to an operation control apparatus and method for a traveling crane having a travel rail laid in a predetermined direction (e.g. east-west direction) in a horizontal plane, a traverse rail (girder) disposed in a direction (e.g. south-north direction) perpendicular to the travel rail and moved along the travel rail by a travel motor, and an electric hoist having a traverse motor for traversing along the traverse rail and an elevation motor for lifting and lowering a load.

BACKGROUND ART

FIG. 1A, FIG. 1B are a schematic external view showing a configuration example of the above-described traveling crane. The illustrated traveling crane 100 has travel rails 101 laid in a predetermined direction (e.g. east-west direction) in the horizontal plane of the ceiling of a building, a traverse rail (girder) 102 disposed in a direction (e.g. south-north direction) perpendicular to the travel rails 101 and moved along the travel rails 101 by geared motors (travel motors) 103, and an electric hoist 106 having a traverse motor 104 for traversing along the traverse rail 102 and an elevation motor 105 for lifting and lowering a load.

In the traveling crane 100, the electric hoist 106 has a control box 107 connected thereto through a cable 108 or the like. The control box 107 is equipped with pushbutton switches "East", "West", "South", "North", "Up" and "Down", for example. In response to the operation of the pushbutton switches "East", "West", "South" and "North", the electric hoist 106 travels in the east-west direction along the travel rails 101 and traverses in the south-north direction along the traverse rail 102. In response to the operation of the pushbutton switches "Up" and "Down", a load (not shown) suspended by a load-suspending hook 109 is lifted and lowered (hoisted up and down). It should be noted that FIG. 1A is a schematic general view showing a configuration example of the traveling crane, and FIG. 1B is an enlarged view of a part of the traveling crane, showing the control box 107.

With the traveling crane arranged as stated above, it is necessary to find out a pushbutton switch corresponding to a direction (travel, traverse, lifting or lowering direction) in which a load (object to be transported) suspended by the load-suspending hook 109 is to be moved from among the pushbutton switches "East", "West", "South", "North", "Up" and "Down" attached to the control box 107. When the electric hoist 106 is operated in both the travel and traverse directions, two pushbutton switches need to be pressed simultaneously. There is another problem that fine speed control for travel, traverse, lifting and lowering cannot be performed.

There is a traveling crane as disclosed in Patent Literature 1, which enables an operator of the traveling crane to translate a transport object in a desired direction simply by adjusting the direction of a control box while pressing a switch and looking in the direction of movement of the transport object moving being suspended by a hook, without the need to look at his or her hand. FIG. 2 is a schematic external view showing a configuration example of the traveling crane disclosed in Patent Literature 1. The illustrated traveling crane 200 has travel rails 201 laid in a predetermined direction in the horizontal plane of the ceiling of a building, a traverse rail (girder) 203 disposed between a pair of saddles 202 traveling along the travel rails 201 through wheels, and an electric hoist 204 traversing along the traverse rail 203 through wheels. A load-suspending hook 206 is secured to the distal end of a support wire rope 205 that is wound up by the electric hoist 204. A communication cable 207 that is bendable but not twistable is suspended from the electric hoist 204 to near the floor surface. A control box 210 is connected to the lower end of the communication cable 207 through a rotatable rotary joint 209.

The front of the control box 210 is provided with a two-step pushbutton control switch 211 and also provided with a lifting (hoist-up) switch and a lowering (hoist-down) switch disposed at the upper and lower sides, respectively, of the control switch 211. When the control switch 211 is pressed, an X-axis motor or a Y-axis motor operates to move the electric hoist 204 horizontally in a direction opposite to the direction in which the control box 210 faces, i.e. a direction opposite to the forward direction of the control box 210. Accordingly, the operator can translate the transport object in a desired direction by adjusting the direction of the control box 210 while pressing the switch and looking in the direction of movement of the transport object moving being suspended by the load-suspending hook 206, without the need to look at his or her hand.

CITATION LIST

Patent Literature

Patent Literature 1: Japanese Patent Application Publication No. 2007-39232

SUMMARY OF INVENTION

Technical Problem

The conventional traveling crane shown in FIG. 2 has the following problem. When a horizontal motion (travel or traverse motion) of the electric hoist 204 and a lifting or lowering (hoist up or down) operation thereof are performed by using different pushbutton switches, respectively, both hands are needed to operate the pushbutton switches for the respective operations. There is another problem that the conventional controller requires the operator to hold the control box in his or her hand. Therefore, at least one of the two hands is used to hold the control box, and hence it is impossible to perform an operation needing both hands while operating the traveling crane.

The present invention has been made in view of the above-described circumstances. An object of the present invention is to provide a traveling crane operation control apparatus and method enabling an operator to operate a traveling crane quickly and accurately by one hand and by a motion of his or her body with a controller worn thereon, without the need to gaze at his or her hand, and also allowing variable-speed control and fine speed control of each drive unit.

Solution to Problem

To solve the above-described problem, the present invention provides an operation control apparatus for a traveling crane having a travel rail laid in a predetermined direction in a horizontal plane, a traverse rail disposed in a direction perpendicular to the travel rail and moved along the travel rail by a travel motor, and an electric hoist having a traverse motor for moving along the traverse rail and an elevation motor for lifting and lowering a load. The operation control apparatus has an operation control circuit section including a base unit wearable on an arm of an operator and a control unit operable by the hand of the arm wearing the base unit. The base unit has base unit tilt detecting means detecting a vertical tilt direction and tilt angle of the base unit in a vertical plane, base unit direction detecting means detecting a direction in which the base unit points in a horizontal plane, and command signal generating means generating a travel command signal and a travel speed command signal for the travel motor, a traverse command signal and a traverse speed command signal for the traverse motor, and an elevation command signal and an elevation speed command signal for the elevation motor. The control unit has at least motion decision means outputting a motion decision signal to the command signal generating means of the base unit. In response to the operator pointing the arm wearing the base unit in a moving direction in which the traveling crane is desired to be moved in a horizontal plane, or in a vertical direction in which the traveling crane is desired to be lifted or lowered, or in both the moving direction and the vertical direction, the command signal generating means generates a travel command signal, a travel speed command signal, a traverse command signal and a traverse speed command signal for moving the traveling crane in the moving direction and an elevation command signal and an elevation speed command signal for lifting or lowering the traveling crane based on detection signals from the base unit tilt detecting means or the base unit direction detecting means or from both the base unit tilt detecting means and the base unit direction detecting means on condition that there is the motion decision signal from the motion decision means.

Further, in the above-described traveling crane operation control apparatus of the present invention, the motion decision means of the control unit has a speed signal output function to output a speed signal designating a speed in addition to the motion decision signal. The command signal generating means has a function to generate a travel speed command signal and a traverse speed command signal for moving the traveling crane in the moving direction and an elevation speed command signal for lifting or lowering the traveling crane according to the speed signal from the speed signal output function.

Further, in the above-described traveling crane operation control apparatus of the present invention, the motion decision means of the control unit has a speed signal output function to output a speed signal designating a speed in addition to the motion decision signal. The command signal generating means divides the vertical tilt angle range of the arm into a first tilt angle range<a second tilt angle range<a third tilt angle range and has the following first to third functions according to the range of the vertical tilt angle detected by the base unit tilt detecting means.

A first function: when the detected tilt angle is in the first tilt angle range, the command signal generating means generates a travel command signal and a traverse command signal for moving the traveling crane in the direction detected by the base unit direction detecting means and also generates a travel speed command signal and a traverse speed command signal according to the speed signal output from the speed signal output function of the control unit.

A second function: when the detected tilt angle is in the second tilt angle range, the command signal generating means generates a travel command signal and a traverse command signal for moving the traveling crane in the direction detected by the base unit direction detecting means and generates an elevation command signal for lifting or lowering the traveling crane in the vertical direction detected by the base unit tilt detecting means and further generates a travel speed command signal, a traverse speed command signal and an elevation speed command signal according to the speed signal output from the speed signal output function of the control unit.

A third function: when the detected tilt angle is in the third tilt angle range, the command signal generating means generates an elevation command signal for lifting or lowering the traveling crane in the vertical direction detected by the base unit tilt detecting means and also generates an elevation speed command signal according to the speed signal output from the speed signal output function of the control unit.

Further, in the above-described traveling crane operation control apparatus of the present invention, the first tilt angle range is from 0° to 15°, the second tilt angle range is from 15° to 60°, and the third tilt angle range is from 60° to 90°.

Further, in the above-described traveling crane operation control apparatus of the present invention, the motion decision means of the control unit has a speed signal output function to output a speed signal designating a speed in addition to the motion decision signal. The command signal generating means divides the vertical tilt angle range of the arm into a first tilt angle range<a second tilt angle range<a third tilt angle range and has the following first to third functions according to the range of the vertical tilt angle detected by the base unit tilt direction detecting means.

A first function: when the detected tilt angle is in the first tilt angle range, the command signal generating means generates a travel command signal and a traverse command signal for moving the traveling crane in the direction detected by the base unit direction detecting means and also generates a travel speed command signal and a traverse speed command signal according to the speed signal output from the speed signal output function of the control unit.

A second function: when the detected tilt angle is in the second tilt angle range, the command signal generating means does not generate any of the travel command signal, the travel speed command signal, the traverse command signal, the traverse speed command signal, the elevation command signal and the elevation speed command signal.

A third function: when the detected tilt angle is in the third tilt angle range, the command signal generating means generates an elevation command signal for lifting or lowering the traveling crane in the vertical direction detected by the base unit tilt detecting means and also generates an elevation speed command signal according to the speed signal output from the speed signal output function of the control unit.

Further, in the above-described traveling crane operation control apparatus of the present invention, the first tilt angle range is from 0° to 30°, the second tilt angle range is from 30° to 45°, and the third tilt angle range is from 45° to 90°.

Further, in the above-described traveling crane operation control apparatus of the present invention, the motion decision means of the control unit has a speed signal output function to output a speed signal designating a speed in addition to the motion decision signal and also has an elevation trigger signal output function to output an elevation trigger signal. The command signal generating means has the following first to third functions.

A first function: the command signal generating means generates a travel command signal and a traverse command signal for moving the traveling crane in the direction detected by the base unit direction detecting means and also generates a travel speed command signal and a traverse speed command signal according to the speed signal output from the speed signal output function of the control unit.

A second function: the command signal generating means generates an elevation command signal in response to the elevation trigger signal from the elevation trigger signal output function of the control unit and also generates an elevation speed command signal according to the vertical tilt angle detected by the base unit tilt detecting means.

A third function: the command signal generating means generates a travel command signal and a traverse command signal for moving the traveling crane in the direction detected by the base unit direction detecting means, generates a travel speed command signal and a traverse speed command signal according to the speed signal output from the speed signal output function of the control unit, outputs an elevation command signal in response to the elevation trigger signal from the elevation trigger signal output function of the control unit and further generates an elevation speed command signal according to the vertical tilt angle detected by the base unit tilt detecting means.

Further, in the above-described traveling crane operation control apparatus of the present invention, the control unit is provided with a control unit direction detecting means detecting a direction in which the control unit points in a horizontal plane or a control unit tilt detecting means detecting a vertical tilt direction and tilt angle of the control unit in a vertical plane to detect a relative angle of the wrist to the arm wearing the base unit. The command signal generating means generates an elevation command signal and an elevation speed command signal according to the detected relative angle.

In addition, the present invention provides an operation control apparatus for a traveling crane having a travel rail laid in a predetermined direction in a horizontal plane, a traverse rail disposed in a direction perpendicular to the travel rail and moved along the travel rail by a travel motor, and an electric hoist having a traverse motor for moving along the traverse rail and an elevation motor for lifting and lowering a load. The operation control apparatus has an operation control circuit section including a base unit wearable on an arm of an operator and a control unit wearable on a finger of the arm wearing the base unit. The base unit has base unit direction detecting means detecting a direction in which the base unit points in a horizontal plane, and command signal generating means generating a travel command signal and a travel speed command signal for the travel motor, a traverse command signal and a traverse speed command signal for the traverse motor, and an elevation command signal and an elevation speed command signal for the elevation motor. The control unit has motion decision and speed setting means operable by a finger other than the finger wearing the control unit and outputting a travel-traverse decision signal and a speed signal designating a speed to the command signal generating means of the base unit, and lifting-lowering decision means outputting a lifting-lowering decision signal to the command signal generating means of the base unit. The command signal generating means has the following first and second functions.

A first function: in response to the operator pointing the arm wearing the base unit in a direction in which the traveling crane is desired to be moved in a horizontal plane, the command signal generating means generates a travel command signal and a traverse command signal for moving the traveling crane and also generates a travel speed command signal and a traverse speed command signal according to the speed signal on condition that there is the travel-traverse decision signal from the motion decision and speed setting means.

A second function: the command signal generating means generates an elevation command signal and a constant-speed elevation speed command signal on condition that there is the lifting-lowering decision signal from the lifting-lowering decision means.

Further, in the above-described traveling crane operation control apparatus of the present invention, the base unit has base unit tilt detecting means detecting a vertical tilt direction and angle of the base unit in a vertical plane, and the command signal generating means has the following third function.

A third function: the command signal generating means outputs an elevation command signal and an elevation speed command signal designating a speed corresponding to the tilt angle detected by the base unit tilt detecting means on condition that there is the lifting-lowering decision signal from the lifting-lowering decision means.

In addition, the present invention provides an operation control apparatus for a traveling crane having a travel rail laid in a predetermined direction in a horizontal plane, a traverse rail disposed in a direction perpendicular to the travel rail and moved along the travel rail by a travel motor, and an electric hoist having a traverse motor for moving along the traverse rail and an elevation motor for lifting and lowering a load. The operation control apparatus has an operation control circuit section including a base unit wearable on a body part of an operator other than an arm of the operator and a control unit operable by a hand of the operator. The control unit has control unit tilt detecting means detecting a vertical tilt direction and tilt angle of the control unit in a vertical plane, a control unit direction detecting means detecting a direction in which the control unit points in a horizontal plane, and motion decision and speed setting means outputting a motion decision signal and a speed signal. The base unit has command signal generating means generating a travel command signal and a travel speed command signal for the travel motor, a traverse command signal and a traverse speed command signal for the traverse motor, and an elevation command signal and an elevation speed command signal for the elevation motor. The command signal generating means of the base unit classifies the tilt angle detected by the control unit tilt detecting means into one of three tilt angle ranges and has the following first to third functions on condition that there is the motion decision signal from the motion decision and speed setting means.

A first function: when the detected tilt angle is in the first tilt angle range, the command signal generating means generates a travel command signal, a traverse command signal, and speed command signals respectively associated with the command signals.

A second function: when the detected tilt angle is in the second tilt angle range, the command signal generating means generates a travel command signal, a traverse command signal, and a lifting or lowering command signal according to whether the tilt direction of the control unit is upward or downward, and also generates speed command signals respectively associated with the command signals.

A third function: when the detected tilt angle is in the third tilt angle range, the command signal generating means generates a lifting or lowering command signal according to whether the tilt direction of the control unit is upward or downward, and also generates a speed command signal associated with the lifting or lowering command signal.

Further, in the above-described traveling crane operation control apparatus of the present invention, the command signal generating means generates speed command signals respectively associated with the travel command signal and the traverse command signal for the first tilt range according to the speed signal from the motion decision and speed setting means, generates speed command signals respectively associated with the travel command signal and the traverse command signal for the second tilt range according to the speed signal from the motion decision and speed setting means, generates a speed command signal associated with the lifting or lowering command signal for the second tilt range according to the detected tilt angle from the control unit tilt detecting means, and generates a speed command signal associated with the lifting or lowering command signal for the third tilt range according to the speed signal from the motion decision and speed setting means.

Further, in the above-described traveling crane operation control apparatus of the present invention, the first tilt angle range is from 0° to 15°, the second tilt angle range is from 15° to 60°, and the third tilt angle range is from 60° to 90°.

In addition, the present invention provides an operation control method for a traveling crane having a travel rail laid in a predetermined direction in a horizontal plane, a traverse rail disposed in a direction perpendicular to the travel rail and moved along the travel rail by a travel motor, and an electric hoist having a traverse motor for moving along the traverse rail and an elevation motor for lifting and lowering a load. An operator wears on his or her body a base unit including tilt detecting means detecting a vertical tilt direction of the base unit in a vertical plane and direction detecting means detecting a direction in which the base unit points in flat surface. The operator points the base unit in a moving direction in which the traveling crane is desired to be moved in a horizontal plane, or in a vertical direction in which the traveling crane is desired to be lifted or lowered in a vertical plane, or in both the moving direction and the vertical direction, and operates a hand-operated control unit by his or her finger, thereby moving the traveling crane in the moving direction, or lifting or lowering the traveling crane in the vertical direction, or moving and lifting or lowering the traveling crane simultaneously.

Advantageous Effects of Invention

According to the present invention, the following advantageous effects can be obtained.

(1) The operation control circuit section includes a base unit and a control unit, and a minimum number of pushbutton switches, including a variable-speed pushbutton switch, necessary for operation control are disposed on the control unit. Therefore, the control unit has a reduced size, and it is possible to perform operation control of the traveling crane by a simple operation without the need to gaze at the control unit.

(2) The base unit tilt detecting means of the base unit worn on an arm detects a vertical tilt direction and angle of the base unit in a vertical plane, and the base unit direction detecting means of the base unit detects a direction in which the base unit points in a horizontal plane. Therefore, it is possible to move and lift or lower the traveling crane at a designated speed simply by pointing the base unit in a direction in which the traveling crane is desired to be moved and/or in a vertical direction in which the traveling crane is desired to be lifted or lowered, and operating the control unit. Accordingly, it is possible to perform fine and accurate speed and position control.

(3) The operator can designate a moving direction and a lifting or lowering direction by a body motion with the base unit worn on his or her arm, head, waist, etc. Accordingly, the rotating range is large, and a desired direction can be finely designated.

(4) Even when the base unit of the operation control circuit section is moved, none of travel, traverse, lifting and lowering motions of the traveling crane occur unless the control unit is operated to output a motion decision signal. Accordingly, accidental erroneous operation can be prevented, and thus safety can be ensured.

DESCRIPTION OF EMBODIMENTS

Figure 1B:
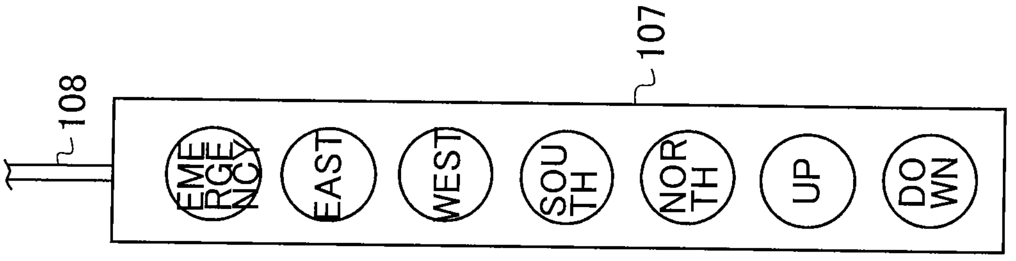
FIG. 1B is an enlarged view of a part of the traveling crane, showing the control box 107.
Figure 1A:
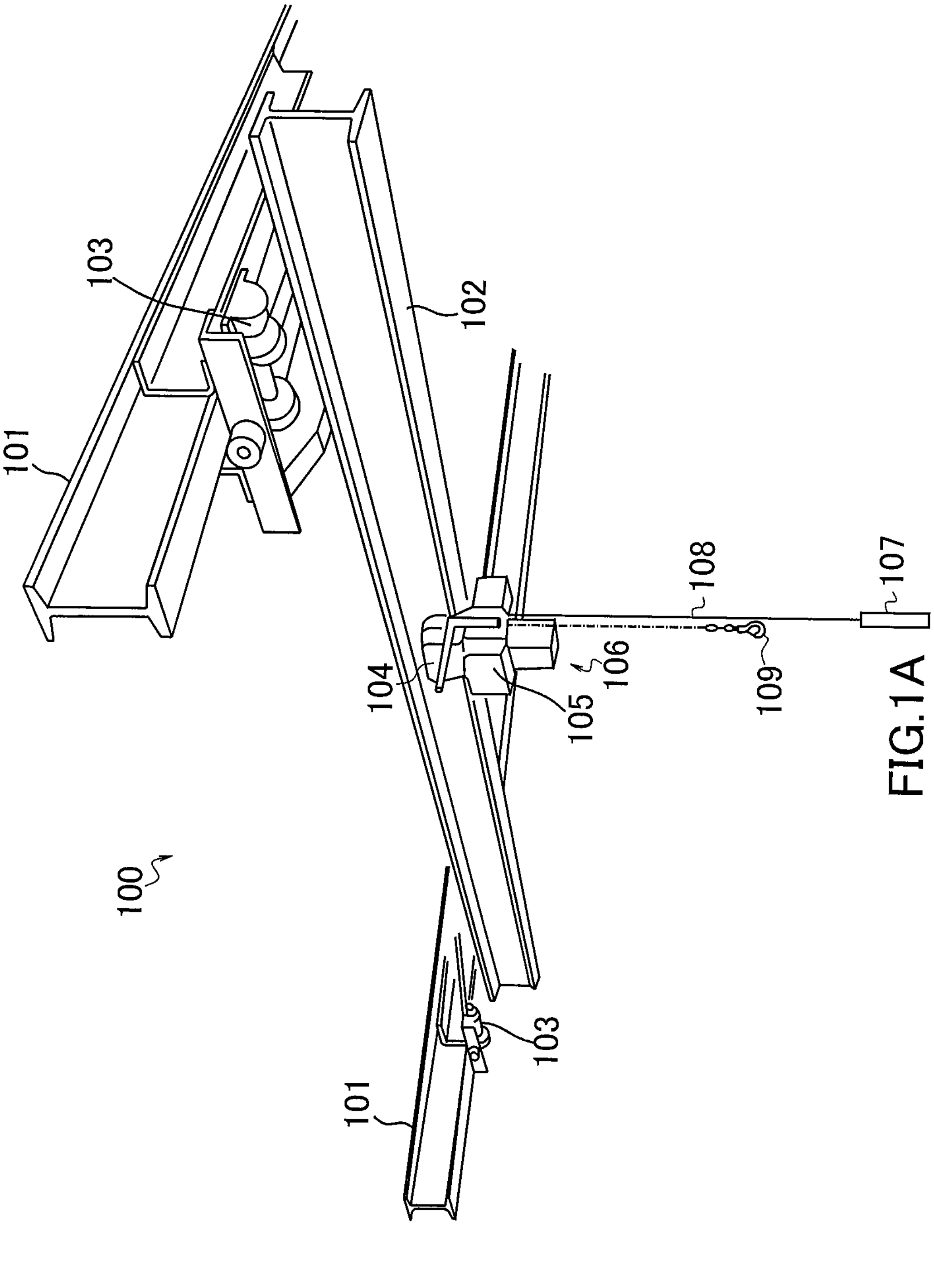
FIG. 1A is a schematic general view showing a configuration example of the traveling crane.
Figure 2:
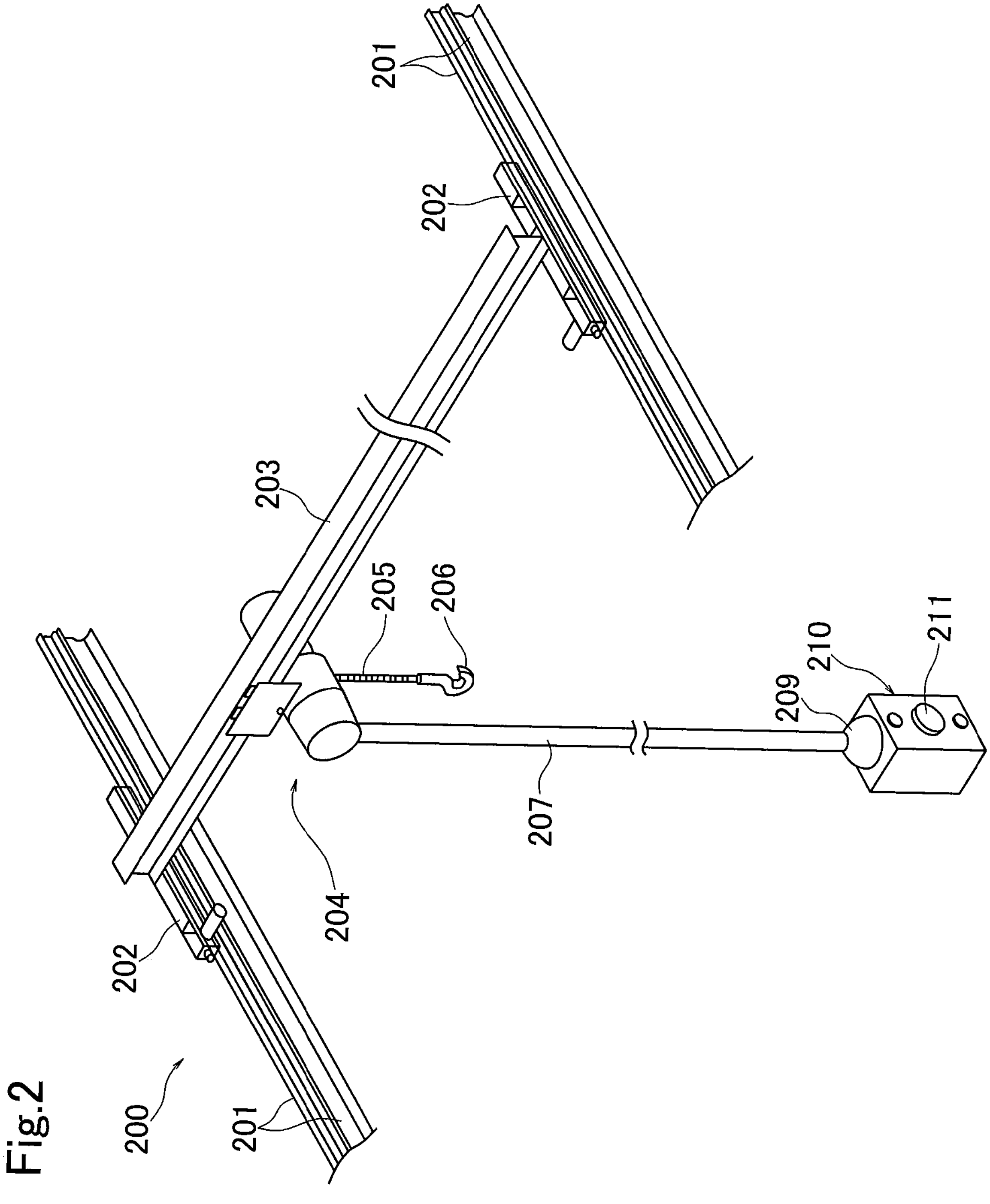
FIG. 2 is a schematic external view showing a configuration example of another conventional traveling crane.

Embodiments of the present invention will be explained below in detail with reference to the drawings. It should be noted that the structure of a traveling crane using an operation control apparatus according to the present invention is similar to those shown in FIGS. 1 and 2; therefore, a description thereof is omitted.

First Embodiment

Figure 3:
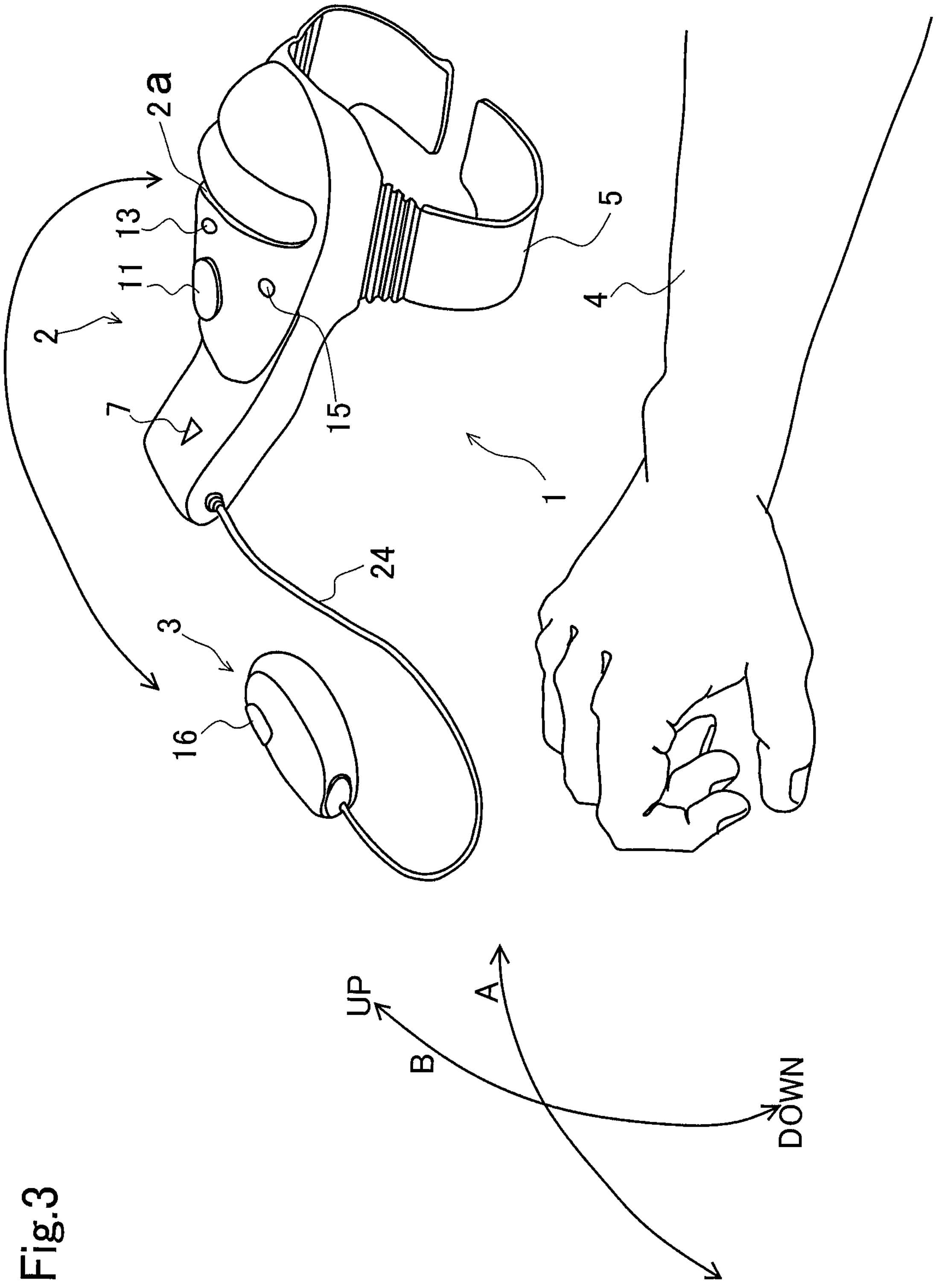
FIG. 3 is an external view showing a configuration example of a traveling crane operation control circuit section according to the present invention.

FIG. 3 is an external view showing a configuration example of an operation control circuit section of a traveling crane according to the present invention. The operation control circuit section 1 includes a base unit 2 and a control unit 3. The control unit 3 can be detachably fitted into a groove-shaped housing part 2*a* formed on the top of the base unit 2. The base unit 2 is wearable on an arm 4 by using an arm belt 5. The base unit 2 is provided with an emergency stop pushbutton switch 11, an indicator 7 comprising an LED (Light Emitting Diode) or the like to indicate that the apparatus is in operation, a reset pushbutton switch 13, and a power switch 15. The control unit 3 is provided with a motion decision variable-speed pushbutton switch 16.

With the operation control circuit section 1 arranged as stated above, an operator wears the base unit 2 on the arm 4 and holds the control unit 3 in the hand. In this state, the operator can press the motion decision variable-speed pushbutton switch 16 by his or her finger. The base unit 2 is equipped with a gyro-sensor and an acceleration sensor, as will be detailed later. When the operator rotates the arm 4 wearing the base unit 2 in a horizontal plane as indicated by arrow A, the gyro-sensor detects a direction (rotation angle) in which the arm 4 points in the horizontal plane. When the operator tilts the arm 4 upward or downward as indicated by arrow B, the acceleration sensor detects a vertical tilt and tilt angle of the arm 4. In other words, the gyro-sensor acts as a horizontal plane angle detector detecting a rotation angle of the base unit 2 in a horizontal plane, and the acceleration sensor acts as a vertical plane angle detector detecting a tilt direction and tilt angle of the base unit 2 in a vertical plane (up-down plane). By pointing the arm 4 in a direction in which the operator wants to move the electric hoist 106 or 204 (see FIGS. 1A and 2) of the traveling crane in a horizontal plane and pressing the motion decision variable-speed pushbutton switch 16 of the control unit 3, the electric hoist 106 or 204 can be moved (traveled and traversed) in the desired direction. By pointing the arm 4 in a direction (upward or downward) in which the operator wants to lift or lower the load-suspending hook 109 or 206 of the electric hoist 106 or 204 and pressing the motion decision variable-speed pushbutton switch 16, the load-suspending hook 109 or 206 can be lifted or lowered.

Figure 4:
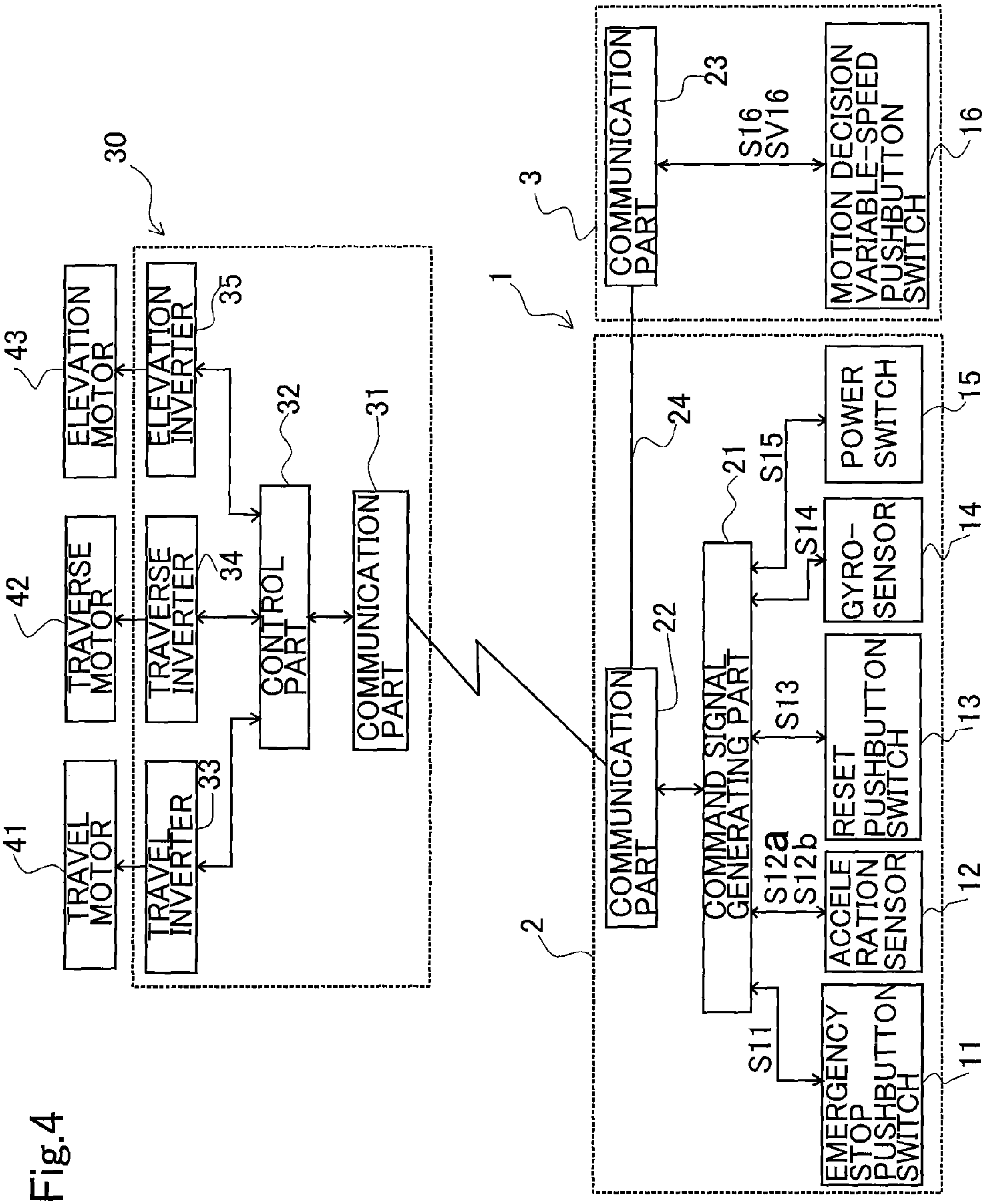
FIG. 4 is a block diagram showing the overall system configuration of a traveling crane operation control apparatus according to the present invention.

FIG. 4 is a block diagram showing the overall system configuration of a traveling crane operation control apparatus according to the present invention. The traveling crane operation control apparatus comprises an operation control circuit section 1 and a motor drive control circuit section 30. The operation control circuit section 1 comprises a base unit 2 and a control unit 3. The base unit 2 has an emergency stop pushbutton switch 11, an acceleration sensor 12, a reset pushbutton switch 13, a gyro-sensor 14, a power switch 15, a command signal generating part 21, and a communication part 22. The control unit 3 has a motion decision variable-speed pushbutton switch 16 and a communication part 23. The communication part 22 of the base unit 2 and the communication part 23 of the control unit 3 are connected by a communication cable 24 to perform wired signal transmission and reception. It should be noted that signal transmission and reception between the communication parts 22 and 23 may be performed in a wireless manner using radio wave, light, etc. (i.e. signal transmission and reception may be performed without using a communication line, e.g. a communication cable). The motor drive control circuit section 30 has a communication part 31, a control part 32, a travel inverter 33, a traverse inverter 34, and an elevation inverter 35.

Electronic components and devices constituting the command signal generating part 21 and the communication part 22 of the operation control circuit section 1 are housed in the base unit 2 wearable on the arm 4. Electronic components and devices constituting the communication part 23 are housed in the control unit 3. Electronic components and devices constituting the communication part 31 and the control part 32 of the motor drive control circuit section 30 are mounted in the electric hoist (see the electric hoist 106 in FIG. 1A and 204 in FIG. 2).

The command signal generating part 21 of the base unit 2 of the operation control circuit section 1 is supplied with, as input signals, an emergency stop signal S11 generated in response to pressing the emergency stop pushbutton switch 11, a vertical tilt direction detection signal S12*a* indicating whether the distal end portion of the arm 4 is upward or downward, and a tilt angle detection signal S12*b* indicating the tilt angle of the arm distal end portion, which are detected by the acceleration sensor 12, a reset signal S13 generated in response to pressing the reset pushbutton switch 13, a base unit direction detection signal S14 indicating a direction in which the base unit 2 worn on the arm 4 points in a horizontal plane, which is detected by the gyro-sensor 14, and a power ON signal S15 generated in response to pressing the power switch 15. When the motion decision variable-speed pushbutton switch 16 of the control unit 3 is pressed, a motion decision signal S16 is generated. The motion decision signal S16 and a variable-speed signal SV16 corresponding to the pressing force applied to the motion decision variable-speed pushbutton switch 16 are sent to the communication part 22 of the base unit 2 through the communication part 23 and the communication cable 24 and sent from the communication part 22 to the command signal generating part 21. It should be noted that the motion decision variable-speed pushbutton switch 16 is a pushbutton switch using, for example, a pressure-sensitive rubber material (i.e. a rubber material whose resistance varies according to the pressing force applied thereto) so as to be capable of outputting a variable-speed signal SV16 of magnitude corresponding to the pressing force applied thereto as stated above.

The command signal generating part 21 of the base unit 2 receives the vertical tilt direction detection signal S12*a* and the tilt angle detection signal S12*b* from the acceleration sensor 12, the motion decision signal S16 and the variable-speed signal SV16 from the motion decision variable-speed pushbutton switch 16 of the control unit 3, and the base unit direction detection signal S14 from the gyro-sensor 14 to generate a travel command signal and a travel speed command signal for a travel motor 41, a traverse command signal and a traverse speed command signal for a traverse motor 42, and an elevation command signal and an elevation speed command signal for an elevation motor 43, and transmits these signals to the communication part 31 of the motor drive control circuit section 30 through the communication part 22. The communication part 31 sends each of the received command signals to the control part 32. The control part 32 generates a starting signal and a speed signal for the travel motor 41, a starting signal and a speed signal for the traverse motor 42, and a starting signal and a speed signal for the elevation motor 43 based on the command signals and starts the travel inverter 33, the traverse inverter 34 and the elevation inverter 35.

Thus, the travel inverter 33, the traverse inverter 34 and the elevation inverter 35 supply electric power to the travel motor 41, the traverse motor 42 and the elevation motor 43 to start the travel motor 41, the traverse motor 42 and the elevation motor 43, respectively. Consequently, the electric hoist of the traveling crane moves (travels and traverses) in the direction in which the distal end potion of the arm 4 points at the set speed (i.e. speed corresponding to the pressing force applied to the motion decision variable-speed pushbutton switch 16). In addition, the elevation motor 43 is lifted or lowered (hoisted up or down) in the direction in which the distal end portion of the arm 4 points at the set speed (i.e. speed corresponding to the pressing force applied to the motion decision variable-speed pushbutton switch 16). That is, the operator can execute the travel, traverse and elevation operations of the traveling crane quickly and accurately, without the need to gaze at his or her hand, simply by moving the arm 4 upward or downward in a vertical plane, rotating the arm 4 in a horizontal plane and pressing the motion decision variable-speed pushbutton switch 16.

Figure 5:
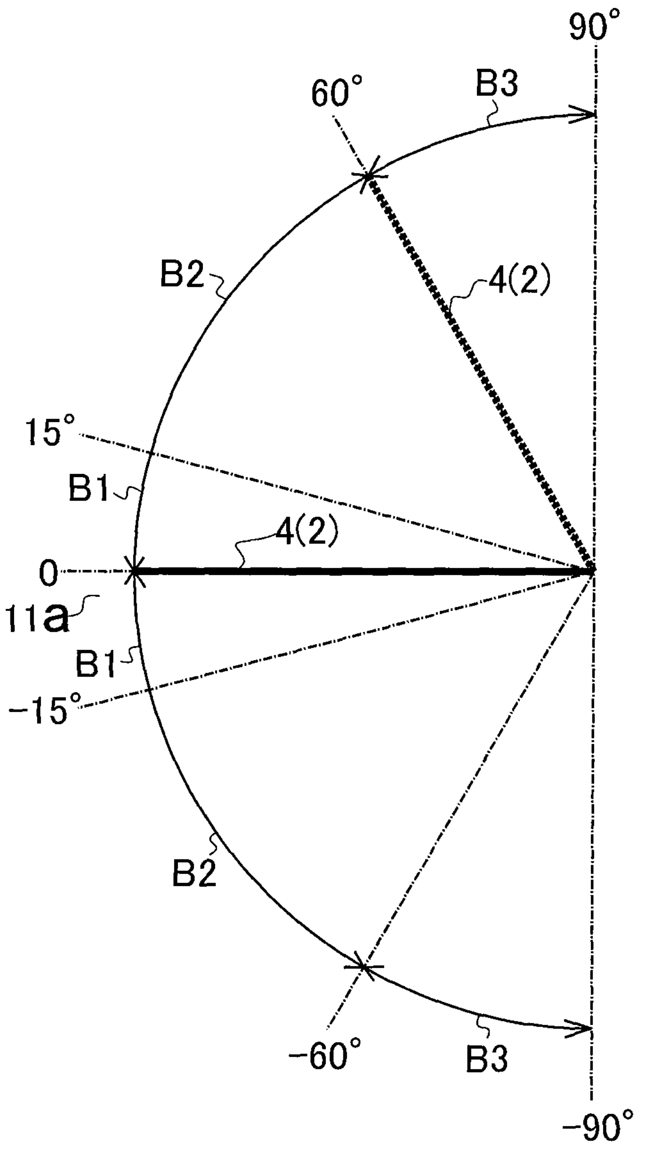
FIG. 5 is an explanatory view illustrating the tilt range of a base unit in a vertical plane.

The operation control procedure will be explained below in detail. The operator wears the base unit 2 on the arm 4 by using the arm belt 5 and holds the control unit 3 in the hand. The tilt direction of the distal end portion of the arm 4 is defined as follows. As shown in FIG. 5, for the upward tilt direction: the range of tilt angles from 0° to 15° is defined as a "first tilt range B1"; the range of tilt angles from 15° to 60° is defined as a "second tilt range B2"; and the range of tilt angles from 60° to 90° is defined as a "third tilt range B3". For the downward tilt direction: the range of tilt angles from 0° to −15° is defined as a "first tilt range B1"; the range of tilt angles from −15° to −60° is defined as a "second tilt range B2"; and the range of tilt angles from −60° to −90° is defined as a "third tilt range B3". The command signal generating part 21 generates command signals for operating the traveling crane according to whether the tilt direction of the arm 4 (base unit 2) is upward or downward and according to the above-described tilt ranges on condition that there is the motion decision signal S16 from the motion decision variable-speed pushbutton switch 16 of the control unit 3, as follows.

[When the distal end portion of the base unit 2 tilts upward] First tilt range B1: When the tilt angle is in the first tilt range B1, only travel and traverse operations of the traveling crane are performed. A travel command signal and a travel speed command signal for the travel motor 41 and a traverse command signal and a traverse speed command signal for the traverse motor 42 are generated to move the traveling crane in the direction in which the arm 4 (base unit 2) points in a horizontal plane, which is represented by the base unit direction detection signal S14 from the gyro-sensor 14, and the generated command signals are transmitted to the motor drive control circuit section 30 to perform only travel and traverse operations of the traveling crane. At this time, as speed signals associated with the travel command signal and the traverse command signal, a travel speed command signal and a traverse speed command signal are generated which designate a speed corresponding to the variable-speed signal SV16 from the motion decision variable-speed pushbutton switch 16.

Second tilt range B2: When the tilt angle is in the second tilt range B2, travel, traverse and elevation operations of the traveling crane are performed. That is, a travel command signal and a travel speed command signal for the travel motor 41, a traverse command signal and a traverse speed command signal for the traverse motor 42, and a lifting command signal and a lifting speed command signal for the elevation motor 43 are generated to move the traveling crane in the direction in which the arm 4 (base unit 2) points, which is represented by the base unit direction detection signal S14 from the gyro-sensor 14, and the generated command signals are transmitted to the motor drive control circuit section 30 to perform travel, traverse and lifting operations of the traveling crane. At this time, as speed signals associated with the travel command signal and the traverse command signal, a travel speed command signal and a traverse speed command signal are generated which designate a speed corresponding to the variable-speed signal SV16 from the motion decision variable-speed pushbutton switch 16 of the control unit 3. As a speed signal associated with the lifting command signal, a lifting speed command signal is generated which designates a speed corresponding to the variable-speed signal SV16 from the motion decision variable-speed pushbutton switch 16 of the control unit 3.

Third tilt range B3: When the tilt angle is in the third tilt range B3, only a lifting operation of the traveling crane is performed. That is, only a lifting command signal for the elevation motor 43 is generated. As a lifting speed command signal associated with the lifting command signal, a lifting speed command signal is generated which designates a speed corresponding to the variable-speed signal SV16 from the motion decision variable-speed pushbutton switch 16 of the control unit 3.

[When the distal end portion of the base unit 2 tilts downward] First tilt range B1: When the tilt angle is in the first tilt range B1, only travel and traverse operations of the traveling crane are performed. That is, a travel command signal and a travel speed command signal for the travel motor 41 and a traverse command signal and a traverse speed command signal for the traverse motor 42 are generated to move the traveling crane in the direction in which the distal end portion of the arm 4 (base unit 2) points, which is represented by the base unit direction detection signal S14 from the gyro-sensor 14, and the generated command signals are transmitted to the motor drive control circuit section 30 to perform only travel and traverse operations of the traveling crane. At this time, as speed signals associated with the travel command signal and the traverse command signal, a travel speed command signal and a traverse speed command signal are generated which designate a speed corresponding to the variable-speed signal SV16 from the motion decision variable-speed pushbutton switch 16 of the control unit 3.

Second tilt range B2: When the tilt angle is in the second tilt range B2, travel, traverse and elevation operations of the traveling crane are performed. That is, a travel command signal and a travel speed command signal for the travel motor 41, a traverse command signal and a traverse speed command signal for the traverse motor 42, and a lowering command signal and a lowering speed command signal for the elevation motor 43 are generated to move the traveling crane in the direction in which the distal end portion of the base unit 2 points, which is represented by the base unit direction detection signal S14 from the gyro-sensor 14, and the generated command signals are transmitted to the motor drive control circuit section 30 to perform travel, traverse and lowering operations of the traveling crane. At this time, as traverse speed signals associated with the travel command signal and the traverse command signal, a travel speed command signal and a traverse speed command signal are generated which designate a speed corresponding to the variable-speed signal SV16 from the motion decision variable-speed pushbutton switch 16 of the control unit 3. As a speed signal associated with the lowering command signal, a lowering speed command signal is generated which designates a speed corresponding to the variable-speed signal SV16 from the motion decision variable-speed pushbutton switch 16 of the control unit 3.

Third tilt range B3: When the tilt angle is in the third tilt range B3, only a lowering operation of the traveling crane is performed. That is, only a lowering command signal for the elevation motor 43 is generated. As a lowering speed command signal associated with the lowering command signal, a lowering speed command signal is generated which designates a speed corresponding to the variable-speed signal SV16 from the motion decision variable-speed pushbutton switch 16 of the control unit 3.

As has been stated above, the range of tilt of the base unit 2 in a vertical plane is divided into first to third tilt ranges. In the first tilt range B1, only travel and traverse operations of the traveling crane are allowed. In the second tilt range B2, travel, traverse and elevation operations of the traveling crane are allowed. In the third tilt range B3, only an elevation operation of the traveling crane is allowed. Thus, the traveling crane can be operated quickly and accurately by a simple operation in which the operator tilts the distal end portion of the base unit 2 worn on the arm 4 in a vertical plane and rotates (pivots) the base unit distal end portion in a horizontal plane and further presses the motion decision variable-speed pushbutton switch 16 attached to the control unit 3, i.e. by an operation not requiring the operator to gaze at his or her hand. In addition, the travel, traverse and elevation speeds are controlled in a continuously variable speed changing manner according to the variable-speed signal SV16 generated in response to pressing the motion decision variable-speed pushbutton switch 16 and the tilt of the base unit 2 worn on the arm 4. Therefore, fine speed control can be performed.

Figure 6:
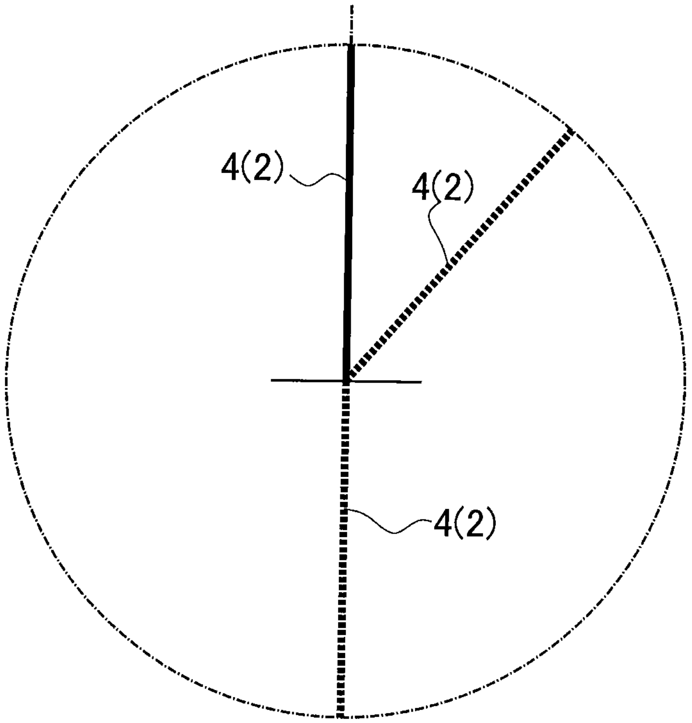
FIG. 6 is an explanatory view illustrating displacement of the base unit in a horizontal plane.

In addition, because motions (travel and traverse) are controlled by detecting the direction in which the distal end portion of the base unit 2 points in a horizontal plane with the gyro-sensor 14, the distal end portion of the arm 4 (base unit 2) can be pointed in any direction through 360° in a horizontal plane as shown in FIG. 6. Accordingly, the electric hoist (see the electric hoist 106 in FIG. 1A and 204 in FIG. 2) of the traveling crane can be rapidly moved to any position where a load is desired to be lifted or lowered.

In addition, starting of the travel motor 41, the traverse motor 42 and the elevation motor 43, i.e. generation of a travel command signal, a traverse command signal and an elevation command signal, is allowed on condition that there is the motion decision signal S16 generated in response to pressing the motion decision variable-speed pushbutton switch 16. Accordingly, the traveling crane is moved (traveled and traversed) or elevated (lifted or lowered) only when the operator changes the direction of the arm 4 in a horizontal plane or the vertical tilt of the arm 4 with intention to perform a travel-traverse operation or lifting or lowering operation of the traveling crane. That is, when the operator accidentally displaces the arm 4 in a horizontal plane or changes the vertical tilt, the traveling crane will not perform any of travel, traverse, lifting and lowering operations unless there is the motion decision signal S16 generated in response to pressing the motion decision variable-speed pushbutton switch 16. Accordingly, safety can be maintained.

It should be noted that the command signal generating part 21 of the base unit 2 of the operation control circuit section 1 and the control part 32 of the motor drive control circuit section 30 comprise microcomputers, respectively. As signal transmission means for the communication parts 22 and 31, wired signal transmission means or wireless signal transmission means using radio wave, light, etc. may be used. It is desirable to select wired signal transmission means from the viewpoint of downsizing the control unit 3 because electric power for control can be supplied to the control unit 3 from a battery (not shown) provided in the base unit 2, which makes it possible to dispense with the battery otherwise provided for the control unit 3.

Figure 7:
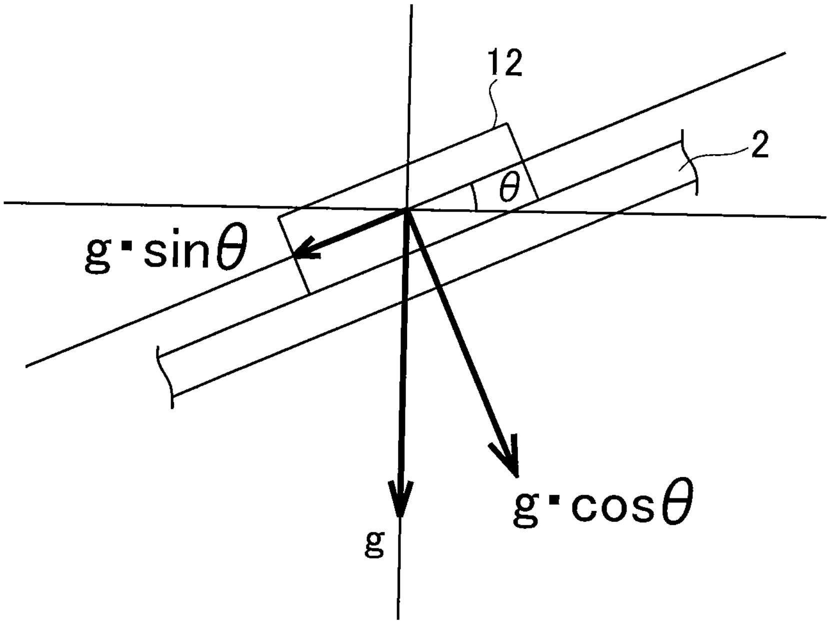
FIG. 7 is an explanatory view of an acceleration sensor.

The following is an explanation of how the acceleration sensor 12 detects a vertical tilt direction and tilt angle of the base unit 2 worn on the arm 4. When the base unit 2 equipped with the acceleration sensor 12 is tilted by an angle $\theta$, as shown in FIG. 7, a decomposed component $g \cdot \sin\theta$ of gravitational acceleration g acts in the mounting direction of the acceleration sensor 12. Accordingly, the acceleration sensor 12 outputs a voltage corresponding to $g \cdot \sin\theta$. As the angle $\theta$ changes from 0 to $\pi/2$, the value of $\sin\theta$ changes from 0.0 to 1.0. When the base unit 2 is most tilted, $\theta = g \cdot \sin\theta$ becomes equal to 1 g. The acceleration sensor 12 delivers an output in terms of voltage value as stated above. Therefore, the width of change in output voltage value from when the base unit 2 is positioned horizontally to when the base unit 2 is positioned vertically is obtained to determine an output voltage value used as a reference value. A difference between the present output voltage of the acceleration sensor 12 and the reference value is obtained, and the resulting value is transformed into an angle by using inverse sine. The angle thus obtained is the present tilt angle of the base unit 2.

Figure 8A:
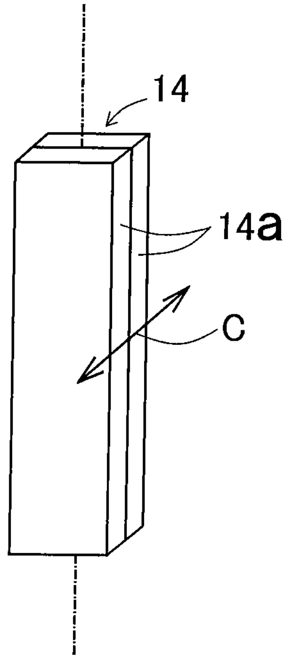
FIG. 8A is a diagram showing the operating principle of a piezoelectric vibratory gyro-sensor when the gyro-sensor when it is stationary.
Figure 8B:
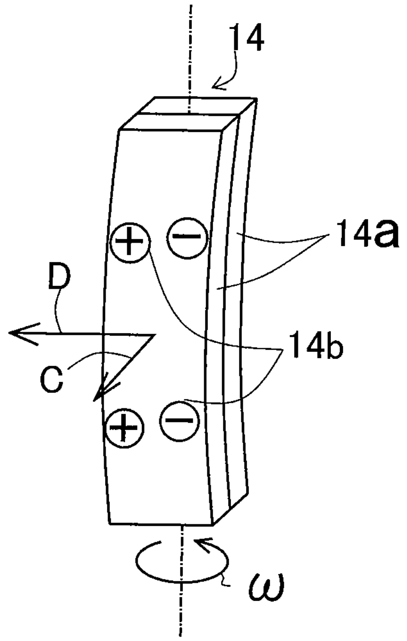
FIG. 8B is a diagram showing the operating principle of a piezoelectric vibratory gyro-sensor when the gyro-sensor when it is rotating.

The following is an explanation of how the direction in which the distal end portion of the base unit 2 points (i.e. the base unit direction) is detected with the gyro-sensor 14. Examples of gyro-sensors include vibratory, mechanical, optical and fluidic gyro-sensors. Any of these gyro-sensors is usable in the traveling crane operation control apparatus of the present invention. For the reason that it is advantageous for downsizing and mass production, a piezoelectric vibratory gyro-sensor is often used. FIG. 8 shows the principle of the piezoelectric vibratory gyro-sensor. FIG. 8A shows the gyro-sensor when it is stationary. FIG. 8B shows the gyro-sensor when it is rotating. The piezoelectric vibratory gyro-sensor 14 has a vibrating element 14*a* comprising piezoelectric elements. When it is stationary, the vibrating element 14*a* is being driven to vibrate as shown by arrow C. When the vibrating element 14*a* is rotating, if an angular velocity $\omega$ is applied thereto around the axis thereof as the center of rotation, Coriolis force acts in the direction shown by arrow D, and electric charge 14*b* is generated in the vibrating element 14*a*. The electric charge is detected to detect the angular velocity $\omega$. Thus, the piezoelectric vibratory gyro-sensor 14 is a sensor detecting the angular velocity $\omega$ and is therefore also known as an angular velocity sensor.

The above-described piezoelectric vibratory gyro-sensor (angular velocity sensor) 14 is installed in position in the base unit 2 as the gyro-sensor 14. The arm 4 is moved so that the distal end portion of the base unit 2 is positioned in a predetermined direction (e.g. the east direction in the east-west direction), and the reset pushbutton switch 13 provided on the base unit 2 is pressed to erase the initial settings of the gyro-sensor 14 and any cumulative error. From the time of the resetting, the angular velocity $\omega$ detected by the gyro-sensor 14 (piezoelectric vibratory gyro-sensor 14) is output to the command signal generating part 21 as a base unit direction detection signal S14. The command signal generating part 21 calculates the amount of rotation (pivoting) of the base unit 2 from the predetermined direction (east direction) in the horizontal direction from the base unit direction detection signal S14 and the elapsed time (integral of the angular velocity $\omega$) to determine the direction in which the base unit 2 points.

When the operator presses the motion decision variable-speed pushbutton switch 16 of the control unit 3 after pointing the base unit 2 in the east direction (travel direction), for example, and pressing the reset pushbutton switch 13, the command signal generating part 21 generates a travel command signal instructing the travel motor 41 to rotate for traveling in the east direction (forward rotation) and also generates a speed command signal according to the variable-speed signal SV16 from the motion decision variable-speed pushbutton switch 16. When the base unit 2 is displaced from the east direction, the gyro-sensor 14 detects an angular velocity ω corresponding to the displacement and outputs it as a base unit direction detection signal S14 to the command signal generating part 21. Thus, the command signal generating part 21 integrates the angular velocity co to obtain a rotation angle from the reference direction (east direction) and calculates rotation directions (travel and traverse directions) and rotation speeds for the travel motor 41 and the traverse motor 42 according to the direction in which the base unit 2 points to generate command signals for the travel motor 41 and the traverse motor 42.

Figure 9:
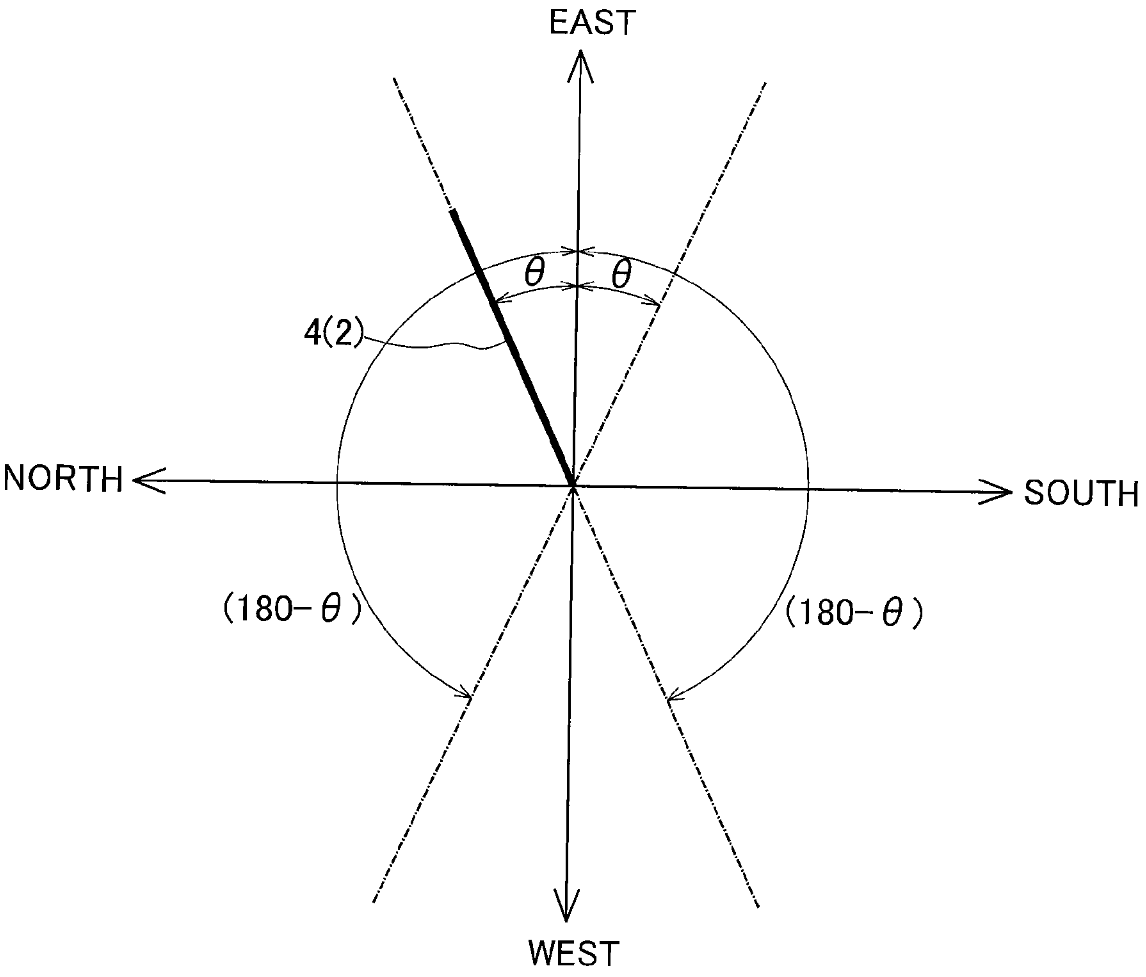
FIG. 9 is a diagram showing the way in which the base unit rotates in a horizontal plane.

When, as shown in FIG. 9, the arm 4 wearing the base unit 2 is turned horizontally from the east direction toward the north through θ (θ°<90°), the command signal generating part 21 generates a travel command signal instructing the travel motor 41 to rotate for traveling in the east direction (forward rotation) and a traverse command signal instructing the traverse motor 42 to rotate for traversing in the north direction (reverse rotation) and controls so that the ratio of the number of revolutions (speed) of the traverse motor 42 to the number of revolutions (speed) of the travel motor 41 is Vcos θ:Vsin θ. When the base unit 2 is turned horizontally from the east direction toward the south through θ°, the command signal generating part 21 generates a travel command signal instructing the travel motor 41 to rotate for traveling in the east direction (forward rotation) and a traverse command signal instructing the traverse motor 42 to rotate for traversing in the south direction (forward rotation) and controls so that the ratio of the number of revolutions (speed) of the traverse motor 42 to the number of revolutions (speed) of the travel motor 41 is Vcos θ:Vsin θ.

When the arm 4 wearing the base unit 2 is turned horizontally from the east direction toward the north through (180-θ)°, the command signal generating part 21 generates a travel command signal instructing the travel motor 41 to rotate for traveling in the west direction (reverse rotation) and a traverse command signal instructing the traverse motor 42 to rotate for traversing in the north direction (reverse rotation) and controls so that the ratio of the number of revolutions (speed) of the traverse motor 42 to the number of revolutions (speed) of the travel motor 41 is Vcos θ:Vsin θ. When the arm 4 wearing the base unit 2 is turned horizontally from the east direction toward the south through (180-θ)°, the command signal generating part 21 generates a travel command signal instructing the travel motor 41 to rotate for traveling in the west direction (reverse rotation) and a traverse command signal instructing the traverse motor 42 to rotate for traversing in the south direction (forward rotation) and controls so that the ratio of the number of revolutions (speed) of the traverse motor 42 to the number of revolutions (speed) of the travel motor 41 is Vcos θ:Vsin θ.

When the reset pushbutton switch 13 of the base unit 2 is pressed, a reset signal S13 is output to the command signal generating part 21. In receipt of the reset signal S13, the command signal generating part 21 sets the operation control circuit section 1 into an initial state. When the emergency stop pushbutton switch 11 is pressed, the power supply of the operation control circuit section 1 is turned off. In this case, even when the emergency stop pushbutton switch 11 is released, the power supply is not automatically turned on.

Although in the above-described embodiment the motion decision variable-speed pushbutton switch 16 made of a pressure-sensitive rubber material is used as the motion decision and speed setting means to output a variable-speed signal SV16 corresponding to the pressing force applied to the pushbutton switch 16, the motion decision and speed setting means is not limited thereto but may be any other type of switch capable of outputting a motion decision signal and a variable-speed signal, for example, a pushbutton switch capable of outputting a variable-speed signal corresponding to the pressing force applied thereto, or a switch capable of outputting a variable-speed signal corresponding to the stroke of movement of the control unit, which moves through a predetermined stroke. Depending on the specifications of the traveling crane, the pushbutton switch 16 need not be a variable-speed pushbutton switch but may be a pushbutton switch outputting a single-speed signal or a multi-speed signal. In this case, the command signal generating part 21 outputs a single-speed command signal (only a forward or reverse rotation command signal) or a multi-speed command signal.

Although in the above-described embodiment the acceleration sensor 12 is used as the base unit tilt detecting means detecting the vertical tilt direction and tilt angle of the base unit 2, the base unit tilt detecting means is not limited to the acceleration sensor but may be any means capable of detecting the vertical tilt direction and tilt angle of the base unit 2. Although in the above-described embodiment the gyro-sensor 14 is used as the base unit direction detecting means detecting the direction in which the base unit 2 points in a horizontal plane, the base unit direction detecting means is not limited to the gyro-sensor but may be any means capable of detecting the direction in which the base unit 2 points in a horizontal plane.

Figure 10:
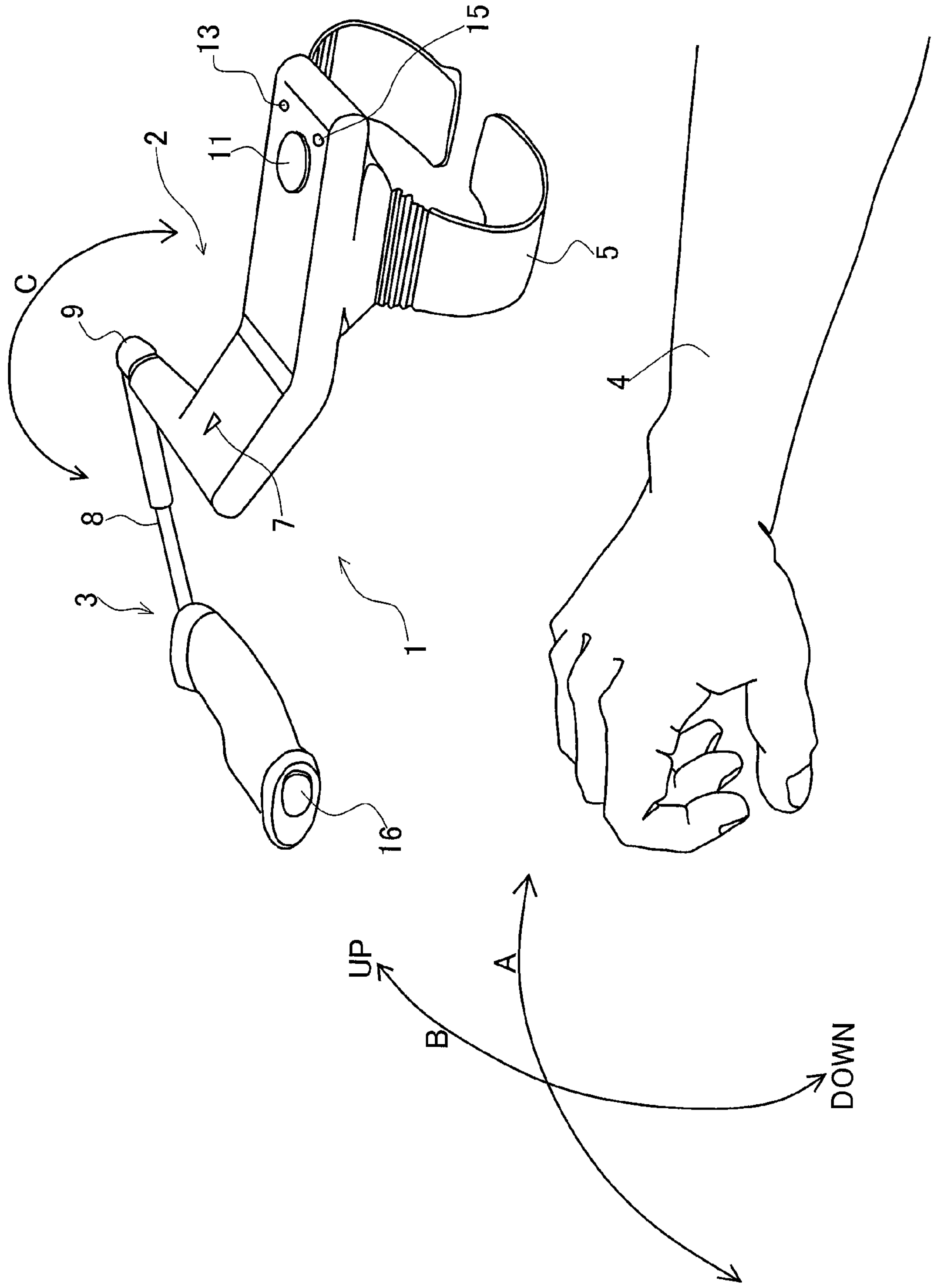
FIG. 10 is an external view showing another configuration example of the traveling crane operation control circuit section according to the present invention.

FIG. 10 is an external view showing another configuration example of the traveling crane operation control circuit section in the first embodiment. The external configuration of this operation control circuit section differs from that shown in FIG. 3 in that the control unit 3 is connected to the base unit 2 through an extensible rod 8. The rod 8 is rotatable about a pivot portion 9 as shown by arrow C. When the operation control circuit section 1 is not used, the rod 8 is rotated about the pivot portion 9 to make the control unit 3 abut on the top of the base unit 2, thereby allowing the operation control circuit section 1 to become compact as a whole. The overall system configuration of the traveling crane operation control apparatus using the operation control circuit section 1 having the external configuration shown in FIG. 10 is the same as that shown in FIG. 4; therefore, a description thereof is omitted.

Second Embodiment

The external configuration of the traveling crane operation control circuit section in the second embodiment is the same as those shown in FIGS. 3 and 10, and the overall system configuration of the operation control apparatus is the same as that shown in FIG. 4; therefore, a description thereof is omitted. In the second embodiment, the method of operating the operation control circuit section 1 differs as follows. First, the operator wears the base unit 2 on the arm 4 and holds the control unit 3 in the hand in the same way as the first embodiment.

When only a travel-traverse operation is performed:

To move the electric hoist 106 or 204 (see FIGS. 1A and 2) in a predetermined direction in a horizontal plane, the operator, while keeping the arm 4 in a horizontal position (vertical tilt angle<30°), points the arm 4 in a direction in which the electric hoist 106 or 204 is desired to be moved, and presses the motion decision variable-speed pushbutton switch 16 by a finger of the hand holding the control unit 3. Consequently, the electric hoist 106 or 204 moves (travels and traverses) in the direction in which the distal end portion of the arm 4 points. The speed of movement at this time is controlled by the pressing force applied to the motion decision variable-speed pushbutton switch 16.

When only a lifting or lowering operation is performed:

To lift the load-suspending hook 109 or 206 (see FIGS. 1A and 2), the operator tilts the arm 4 upward (upward tilt angle>45°) and presses the motion decision variable-speed pushbutton switch 16 by a finger of the hand holding the control unit 3. Consequently the load-suspending hook 109 or 206 lifts.

To lower the load-suspending hook 109 or 206, the operator tilts the arm 4 downward (upward tilt angle>45°) and presses the motion decision variable-speed pushbutton switch 16 by a finger of the hand holding the control unit 3. Consequently, the load-suspending hook 109 or 206 lowers.

The lifting speed and the lowering speed are controlled by the pressing force applied to the motion decision variable-speed pushbutton switch 16.

In this embodiment, a simultaneous operation of moving (traveling and traversing) in a horizontal plane and moving (lifting and lowering) in a vertical plane is not allowed. When the tilt angle of the arm 4 is in the range of from 30° to 45°, both the travel-traverse operation and the lifting-lowering operation are not allowed.

As has been stated above, to perform a lifting or lowering operation, the operator tilts the arm 4 upward at a tilt angle>45° or downward at a tilt angle>45° and presses the motion decision variable-speed pushbutton switch 16 by a finger of the hand holding the control unit 3, thereby lifting or lowering the load-suspending hook 109 or 206. Therefore, the operator need not move the arm 4 upward or downward to a considerable extent during the lifting-lowering operation. In addition, there is provided a dead zone where both the travel-traverse operation and the lifting-lowering operation are not allowed when the tilt angle of the arm 4 is in the range of from 30° to 45°. Therefore, the arm 4 is allowed to tilt slightly from the horizontal position during the travel-traverse operation. It should be noted that the operations of the acceleration sensor 12, the gyro-sensor 14, the reset pushbutton switch 13 and the emergency stop pushbutton switch 11 are the same as those in the above-described first embodiment; therefore, a description thereof is omitted.

Third Embodiment

Figure 11:
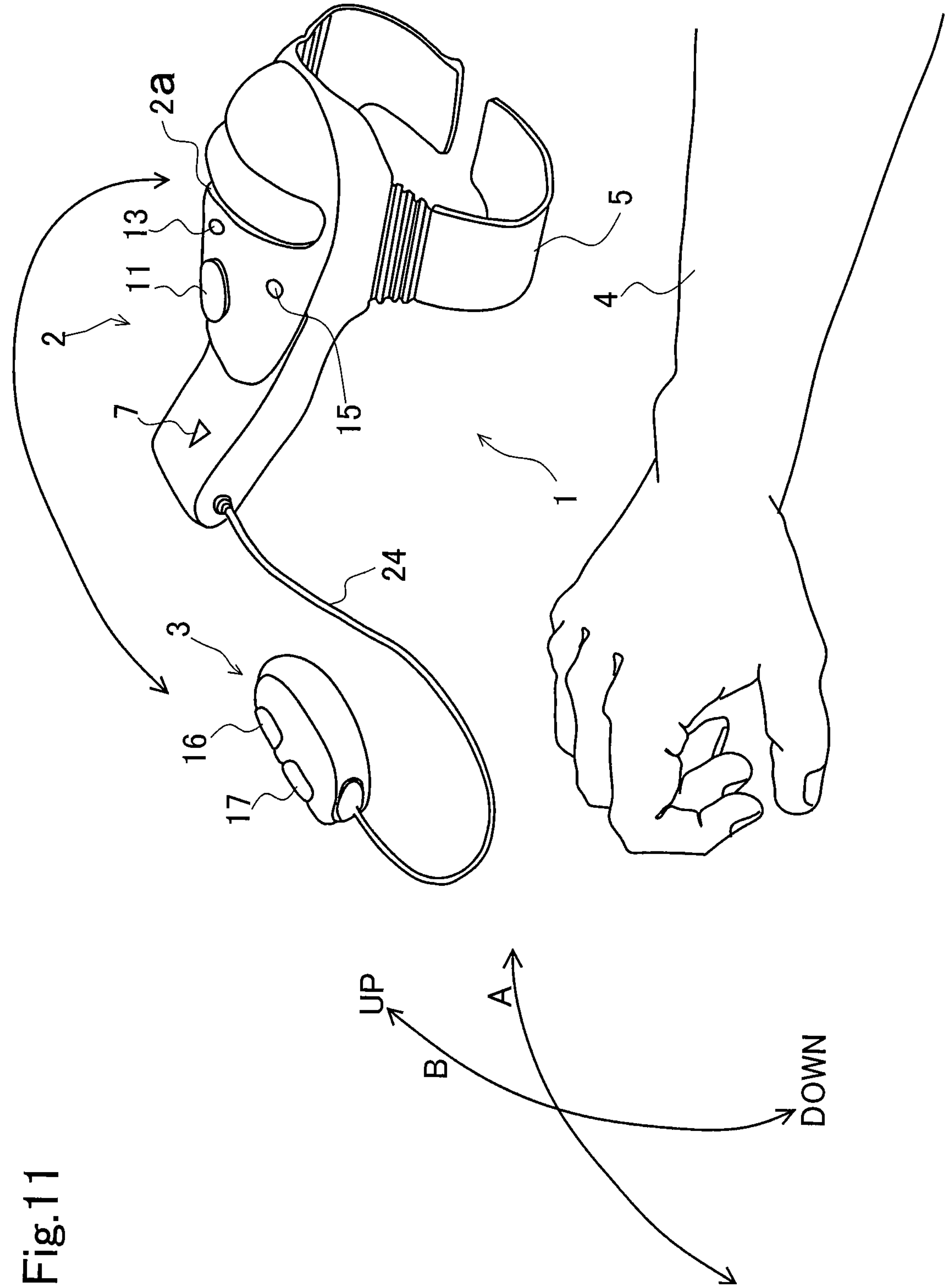
FIG. 11 is an external view showing a configuration example of a traveling crane operation control circuit section according to the present invention.
Figure 12:
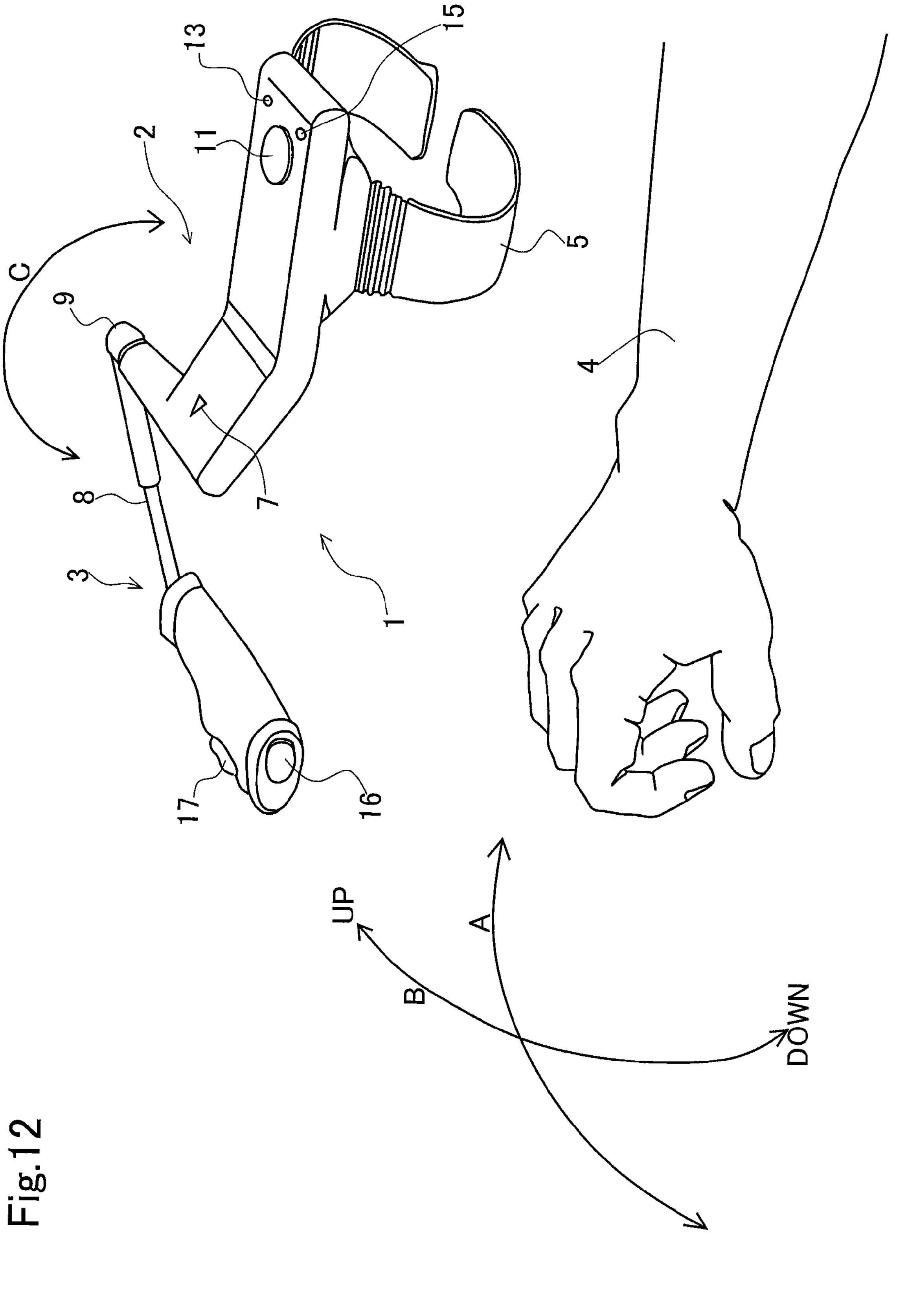
FIG. 12 is an external view showing another configuration example of the traveling crane operation control circuit section according to the present invention.
Figure 13:
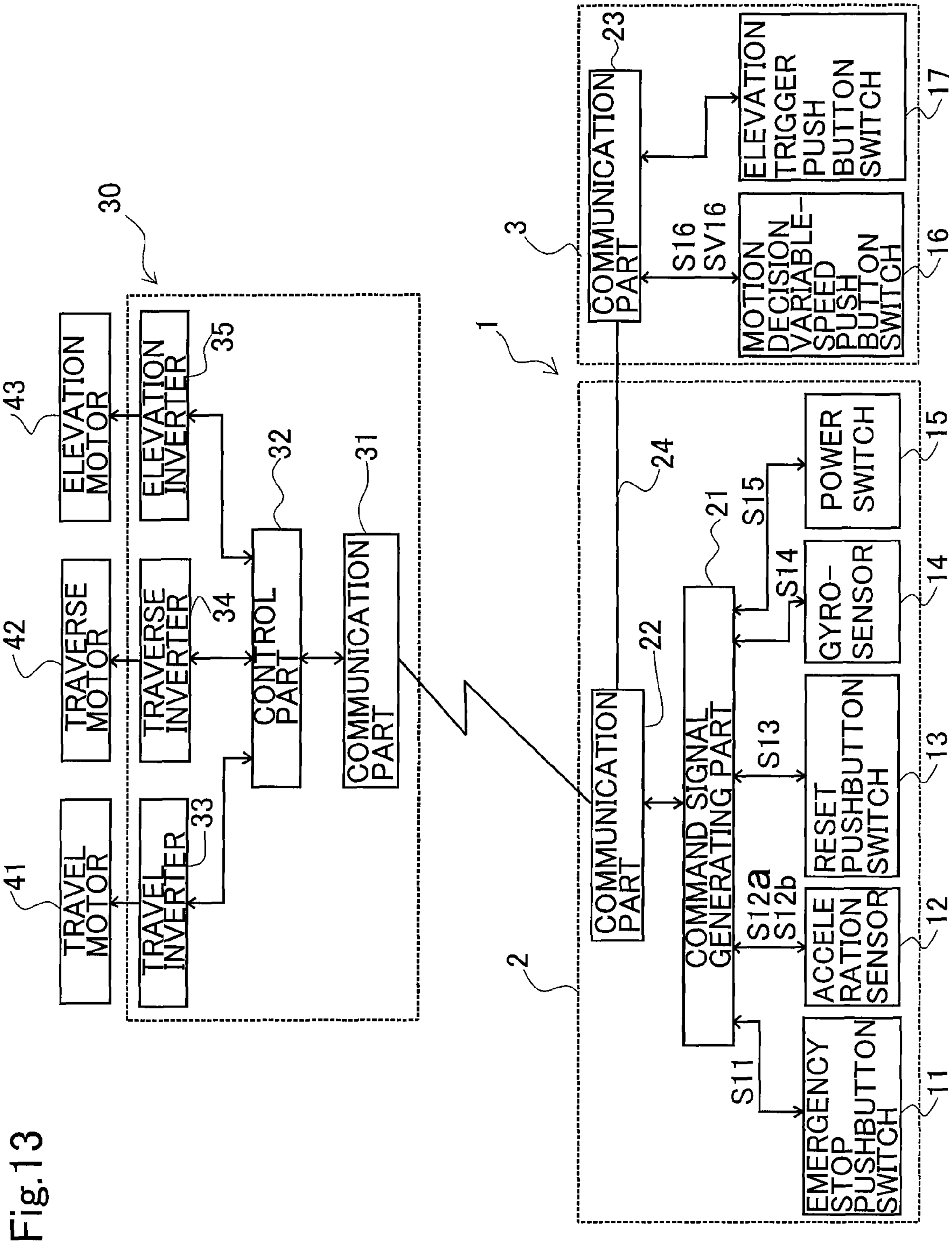
FIG. 13 is a block diagram showing the overall system configuration of a traveling crane operation control apparatus according to the present invention.

FIGS. 11 and 12 are external views showing configuration examples, respectively, of a traveling crane operation control circuit section according to a third embodiment. The external configuration of the operation control circuit section 1 of this embodiment differs from those shown in FIGS. 3 and 10 in that the operation control circuit section 1 has an elevation trigger pushbutton switch 17 provided on the control unit 3. FIG. 13 is a block diagram showing the overall system configuration of the operation control apparatus according to the third embodiment. As shown in the figure, the operation control apparatus differs from that shown in FIG. 4 only in that the control unit 3 is provided with an elevation trigger pushbutton switch 17. The block configurations of the base unit 2 and the motor drive control circuit section 30 are the same as those shown in FIG. 4.

With the traveling crane operation control circuit section of the above-described third embodiment, the operator wears the base unit 2 on the arm 4 and holds the control unit 3 in the hand. The operator actuates the motion decision variable-speed pushbutton switch 16 and the elevation trigger pushbutton switch 17 to operate the traveling crane according to the following procedures.

When only a travel-traverse operation is performed:

To perform only a travel-traverse operation, the operator points the arm 4 in a direction in which the electric hoist 106 or 204 (see FIGS. 1A and 2) is desired to be moved, and presses the motion decision variable-speed pushbutton switch 16 by a finger. Consequently, the electric hoist 109 or 204 moves in the direction that the arm 4 points. The speed of movement at this time is controlled by the pressing force applied to the motion decision variable-speed pushbutton switch 16.

When only a lifting or lowering operation is performed:

To perform a lifting (hoist-up) operation, the operator points the arm 4 upward and presses the elevation trigger pushbutton switch 17 of the control unit 3 by a finger. To perform a lowering (hoist-down) operation, the operator points the arm 4 downward and presses the elevation trigger pushbutton switch 17 of the control unit 3 by a finger. Consequently, the load-suspending hook 109 or 206 lifts or lowers. The lifting speed and the lowering speed at this time are determined according to the tilt angle of the arm 4, which is detected by the acceleration sensor 12 of the base unit 2 (i.e. the base unit direction detection signal S14). For example, if the tilt angle changes from a small value to a large value, the speed changes from a low speed to a high speed.

When a travel-traverse and lifting-lowering operation is performed:

To perform a travel-traverse and lifting-lowering operation, the operator points the distal end portion of the arm 4 in a direction in which the electric hoist 106 or 204 is desired to be moved in a horizontal plane and presses the motion decision variable-speed pushbutton switch 16 by a finger. When the operator wants to lift the load-suspending hook 109 or 206 at the same time as the travel-traverse operation, he or she points the arm 4 upward and presses the elevation trigger pushbutton switch 17 of the control unit 3 by a finger. When the operator wants to lower the load-suspending hook 109 or 206 at the same time as the travel-traverse operation, he or she points the arm 4 downward and actuates the elevation trigger pushbutton switch 17 by a finger. Consequently, it is possible to perform a three-direction simultaneous operation for travel, traverse and either lifting or lowering. In addition, because the control unit 3 is provided with the elevation trigger pushbutton switch 17, it is easy to understand how to perform lifting and lowering operations and hence possible to surely operate the traveling crane. It should be noted that the operations of the acceleration sensor 12, the gyro-sensor 14, the reset pushbutton switch 13 and the emergency stop pushbutton switch 11 are the same as those in the above-described first embodiment; therefore, a description thereof is omitted.

Fourth Embodiment

Figure 14:
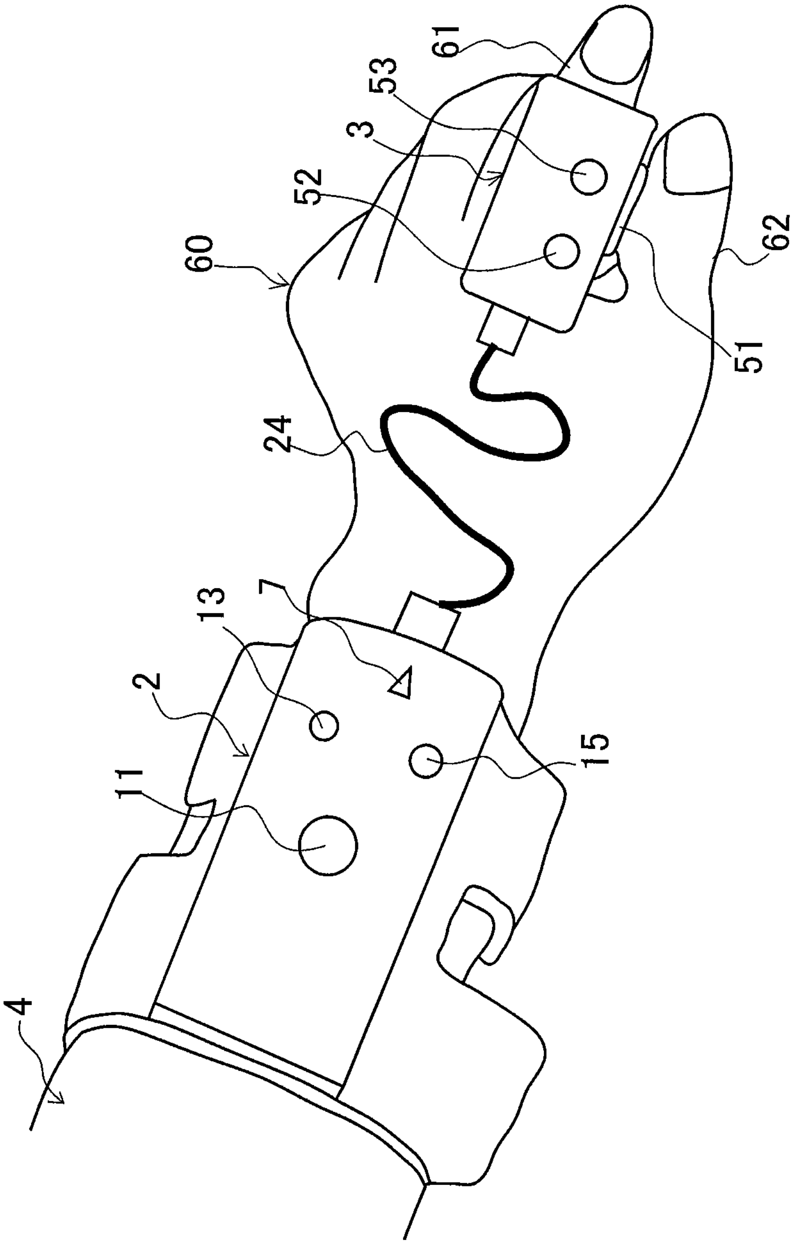
FIG. 14 is an external view showing a configuration example of a traveling crane operation control circuit section according to the present invention.

FIG. 14 is an external view showing a configuration example of a traveling crane operation control circuit section according to a fourth embodiment. As shown in the figure, in the fourth embodiment, the base unit 2 is worn on the arm 4, and the control unit 3 is worn on the forefinger 61 of the hand 60. The base unit 2 is provided with an emergency stop pushbutton switch 11, an indicator 7 comprising an LED or the like to indicate that the apparatus is in operation, a reset pushbutton switch 13, and a power switch 15. The control unit 3 is provided with a travel-traverse decision variable-speed pushbutton switch 51, a lifting decision pushbutton switch 52, and a lowering decision pushbutton switch 53. The travel-traverse decision variable-speed pushbutton switch 51, the lifting decision pushbutton switch 52 and the lowering decision pushbutton switch 53 are each operable by the thumb 62.

Figure 15:
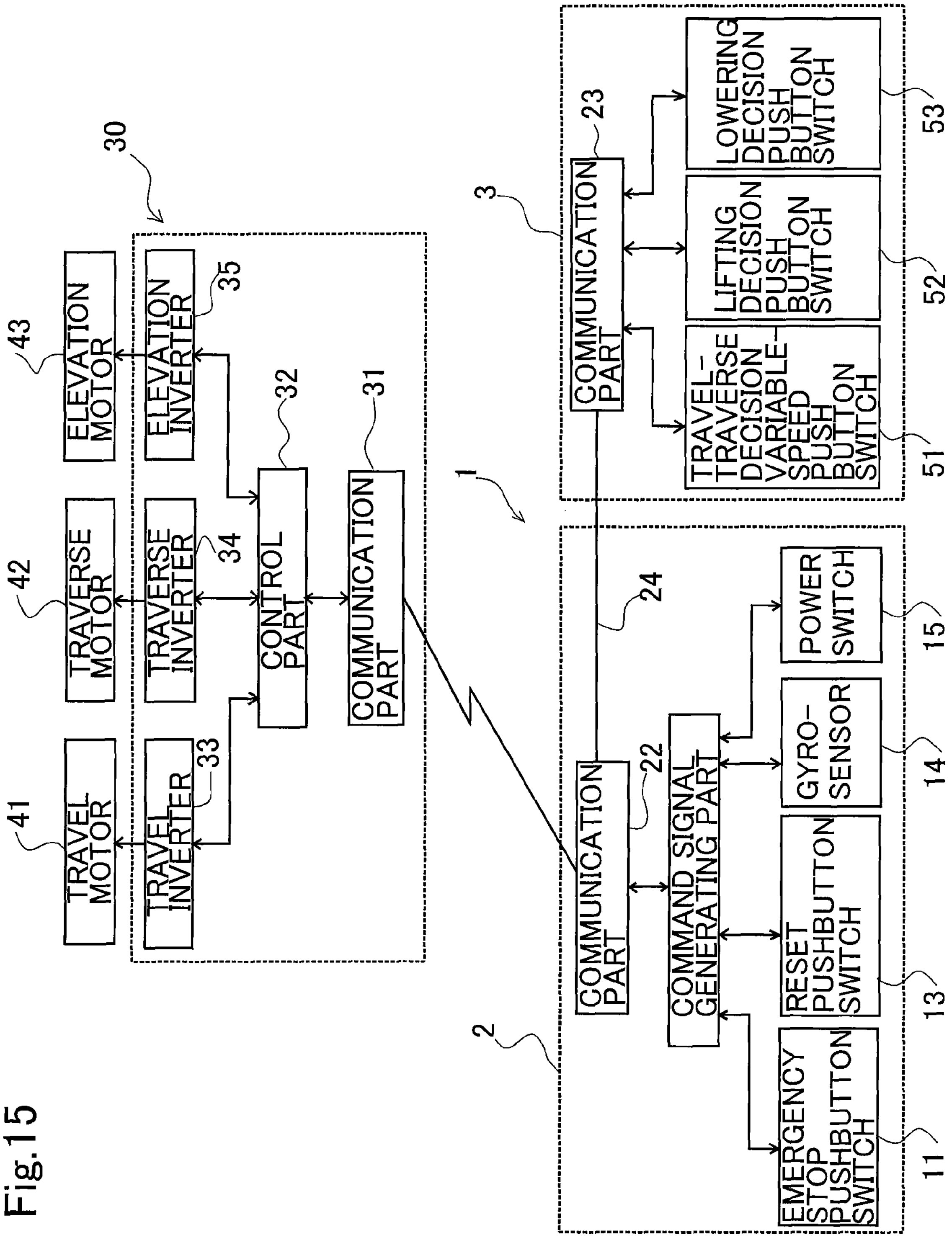
FIG. 15 is a block diagram showing the overall system configuration of a traveling crane operation control apparatus according to the present invention.

FIG. 15 is a block diagram showing the overall system configuration of an operation control apparatus according to the fourth embodiment. As shown in the figure, the base unit 2 is equipped with an emergency stop pushbutton switch 11, a reset pushbutton switch, a gyro-sensor 14, and a power switch 15. In this embodiment, the base unit 2 is not equipped with an acceleration sensor for detecting the vertical direction and angle of the base unit 2. The control unit 3 is equipped with a travel-traverse decision variable-speed pushbutton switch 51, a lifting decision pushbutton switch 52, and a lowering decision pushbutton switch 53.

With the operation control apparatus of the above-described fourth embodiment, the operator wears the base unit 2 on the arm 4 and wears the control unit 3 on the forefinger 61. The operator actuates the travel-traverse decision variable-speed pushbutton switch 51, the lifting decision pushbutton switch 52 and the lowering decision pushbutton switch 53 by the thumb 62 to operate the traveling crane according to the following procedures:

When only a travel-traverse operation is performed:

To perform only a travel-traverse operation, the operator points the arm 4 in a direction in which the electric hoist 106 or 204 (see FIGS. 1A and 2) is desired to be moved in a horizontal plane, and presses the travel-traverse decision variable-speed pushbutton switch 51 by the thumb 62. Consequently, the electric hoist 106 or 204 moves in the direction that the arm 4 points. The speed of the movement at this time is controlled by the pressing force applied to the travel-traverse decision variable-speed pushbutton switch 51.

When only a lifting or lowering operation is performed:

To perform a lifting (hoist-up) operation, the operator points the arm 4 wearing the base unit 2 upward and presses the lifting decision pushbutton switch 52 of the control unit 3 by the thumb 62. Consequently, the load-suspending hook 109 or 206 (see FIGS. 1A and 2) lifts. The lifting speed at this time is a predetermined fixed speed. To perform a lowering (hoist-down) operation, the operator points the arm 4 wearing the base unit 2 downward and presses the lowering decision pushbutton switch 53 of the control unit 3 by the thumb 62. The lowering speed at this time is a predetermined fixed speed.

As has been stated above, the base unit 2 is worn on the arm 4, and the control unit 3 is worn on the forefinger 61 of the hand 60. Accordingly, another operation can be performed by both hands. The lifting-lowering operation is not performed unless the operator presses either the lifting decision pushbutton switch 52 or the lowering decision pushbutton switch 53. Accordingly, a reliable operation control can be performed. The speed of movement (travel and traverse motion) in a horizontal plane can be variably controlled. It should be noted that the operations of the gyro-sensor 14, the reset pushbutton switch 13 and the emergency stop pushbutton switch 11 are the same as those in the above-described first embodiment; therefore, a description thereof is omitted.

Fifth Embodiment

Figure 16:
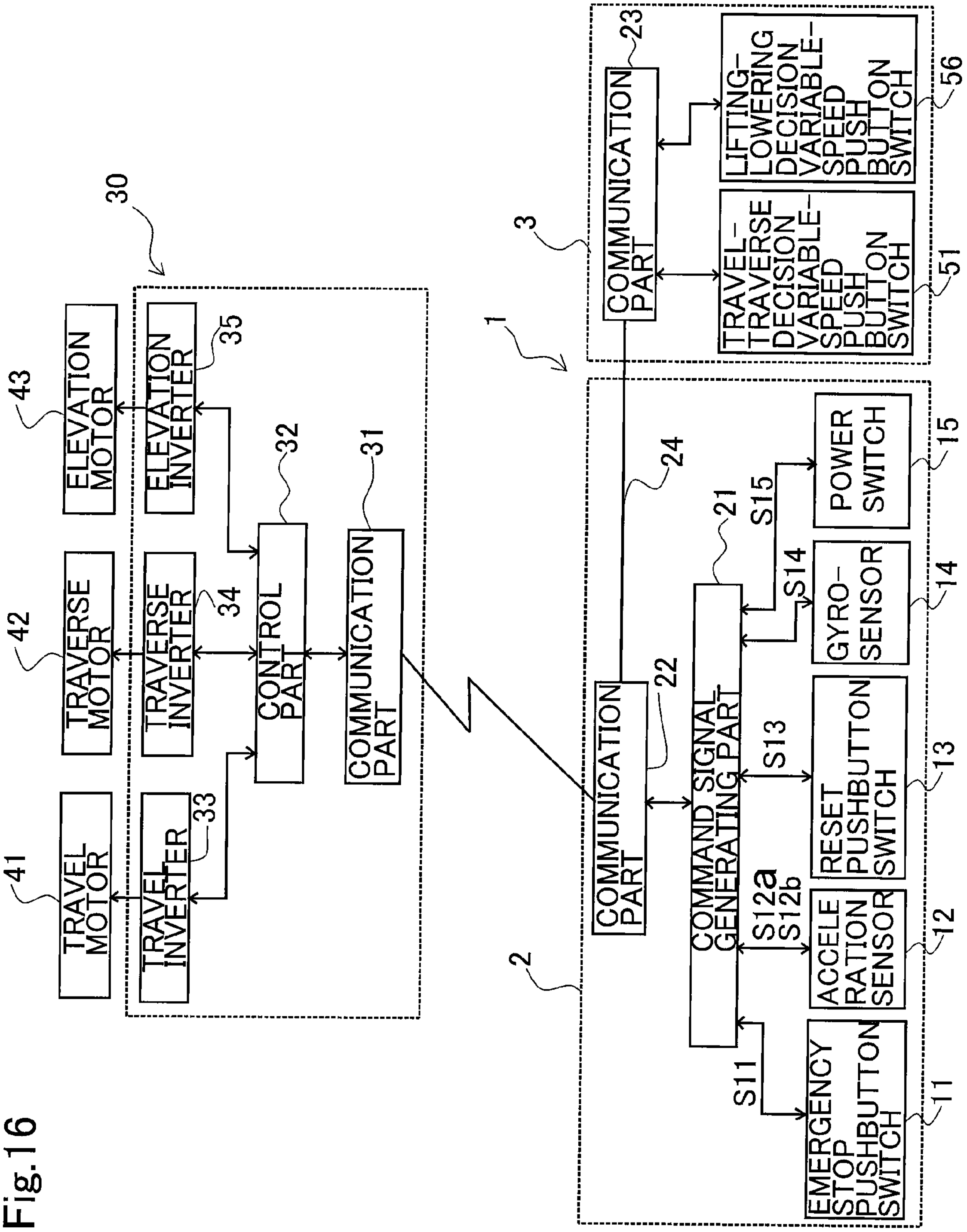
FIG. 16 is a block diagram showing the overall system configuration of a traveling crane operation control apparatus according to the present invention.

FIG. 16 is a block diagram showing the overall system configuration of an operation control apparatus according to a fourth embodiment. It should be noted that the external configuration of the traveling crane operation control circuit section in the fifth embodiment is the same as in FIGS. 11 and 12 except that the control unit 3 is provided with two switches, i.e. a travel-traverse decision variable-speed pushbutton switch 51 and a lifting-lowering decision variable-speed pushbutton switch 56, at respective positions where these switches can be pressed by a finger. Therefore, a description of the traveling crane operation control circuit section is omitted. In the fifth embodiment, the base unit 2 is provided with an emergency stop pushbutton switch 11, an acceleration sensor 12, a reset pushbutton switch 13, a gyro-sensor 14, and a power switch 15. The control unit 3 is provided with a travel-traverse decision variable-speed pushbutton switch 51 and a lifting-lowering decision variable-speed pushbutton switch 56 as stated above.

With the operation control apparatus of the fifth embodiment, the operator wears the base unit 2 on the arm 4 and holds the control unit 3 in the hand. The operator actuates the travel-traverse decision variable-speed pushbutton switch 51 and the lifting-lowering decision variable-speed pushbutton switch 56 to operate the traveling crane according to the following procedures.

When only a travel-traverse operation is performed:

To perform only a travel-traverse operation, the operator points the arm 4 in a direction in which the operator wants to move the electric hoist 106 or 204 (see FIGS. 1A and 2) in a horizontal plane and presses the travel-traverse decision variable-speed pushbutton switch 51 by a finger. Consequently, the electric hoist 106 or 204 moves in the direction that the arm 4 points. The speed of movement at this time corresponds to the pressing force applied to the travel-traverse decision variable-speed pushbutton switch 51

When only a lifting or lowering operation is performed:

To perform a lifting (hoist-up) operation, the operator points the arm 4 upward and presses the lifting-lowering decision variable-speed pushbutton switch 56 of the control unit 3. Consequently, a lifting operation is performed. To perform a lowering operation, the operator points the arm 4 downward and presses the lifting-lowering decision variable-speed pushbutton switch 56 of the control unit 3. Consequently, a lowering operation is performed. Thus, the load-suspending hook 109 or 206 (see FIGS. 1A and 2) lifts or lowers. The lifting speed and the lowering speed correspond to the pressing force applied to the lifting-lowering decision variable-speed pushbutton switch 56. It should be noted that the operations of the acceleration sensor 12, the gyro-sensor 14, the reset pushbutton switch 13 and the emergency stop pushbutton switch 11 are the same as those in the above-described first embodiment; therefore, a description thereof is omitted.

When a travel-traverse and lifting-lowering operation is performed:

To perform a travel-traverse and lifting-lowering operation, the operator points the distal end portion of the arm 4 in a direction in which he or she wants to move the electric hoist 106 or 204 in a horizontal plane, and presses the travel-traverse decision variable-speed pushbutton switch 51 by a finger. To lift the load-suspending hook 109 or 206 at the same time as the travel-traverse operation, the operator points the arm 4 upward and presses the lifting-lowering decision variable-speed pushbutton switch 56 of the control unit 3 by a finger. To lower the load-suspending hook 109 or 206 at the same time as the travel-traverse operation, the operator points the arm 4 downward and presses the lifting-lowering decision variable-speed pushbutton switch 56 by a finger. Consequently, it is possible to perform a three-direction simultaneous operation for travel, traverse and either lifting or lowering. The speed of movement at this time corresponds to the pressing force applied to each of the travel-traverse decision variable-speed pushbutton switch 51 and the lifting-lowering decision variable-speed pushbutton switch 56.

Sixth Embodiment

Figure 17:
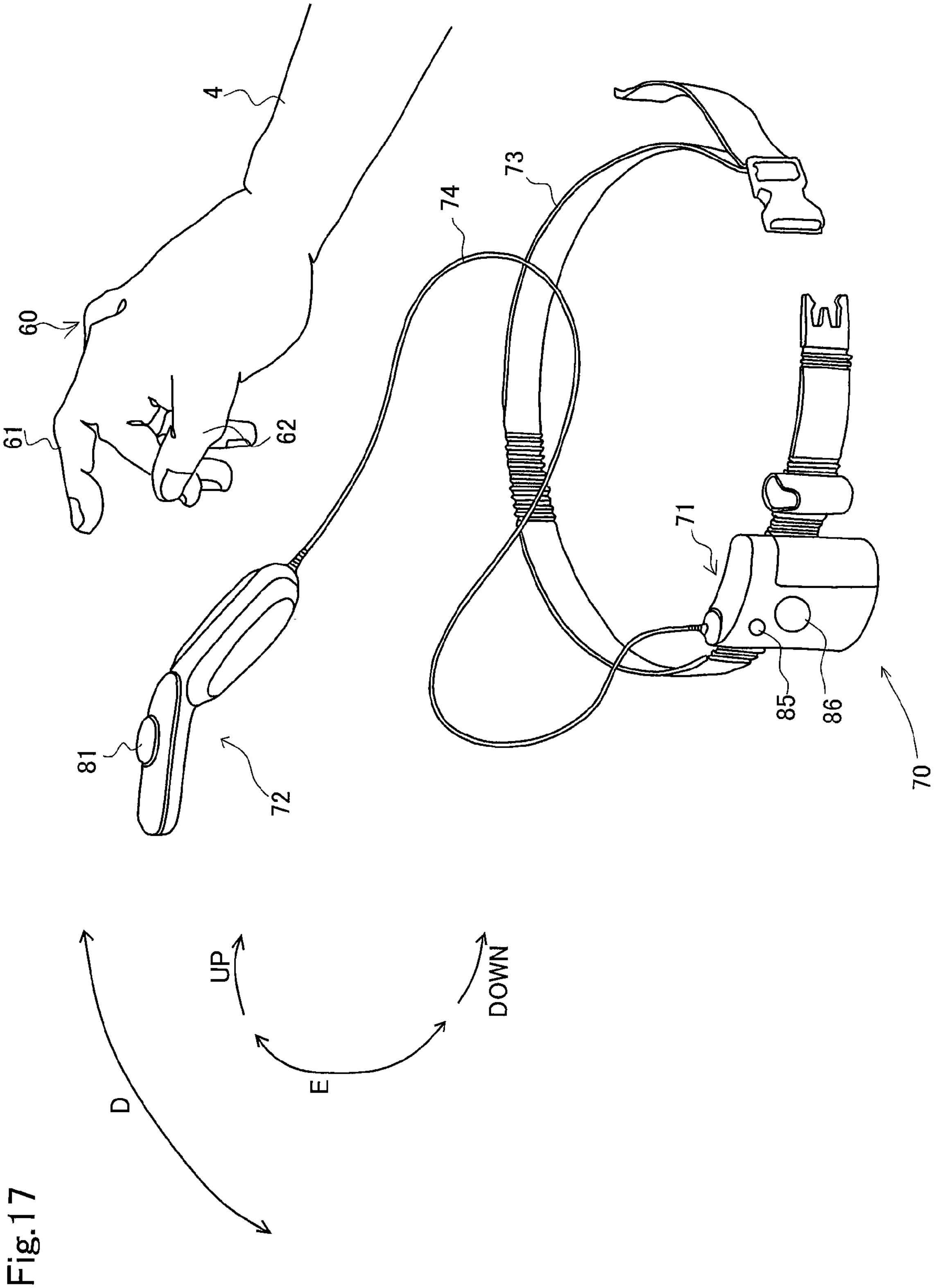
FIG. 17 is an external view showing a configuration example of a traveling crane operation control circuit section according to the present invention.

FIG. 17 is an external view showing a configuration example of a traveling crane operation control circuit section according to a sixth embodiment. As shown in the figure, the operation control circuit section 70 of the sixth embodiment has a base unit 71 and a control unit 72. The base unit 71 is wearable on the waist of an operator by using a wearing belt 73. The control unit 72 can be held in a hand. The base unit 71 and the control unit 72 are connected through a cable 74. The base unit 71 is provided with a power pushbutton switch 85 and an emergency stop pushbutton switch 86. The control unit 72 is provided with a motion decision variable-speed pushbutton switch 81. The operator holds the control unit 72 in a hand and rotates (pivots) the arm 4 in a horizontal plane using the elbow as the center of rotation as shown by arrow D. This enables designation of the direction of movement (travel and traverse) of the electric hoist 106 or 204. By tilting the control unit 72 vertically using the wrist as the center of rotation, the lifting-lowering speed can be controlled.

Figure 18:
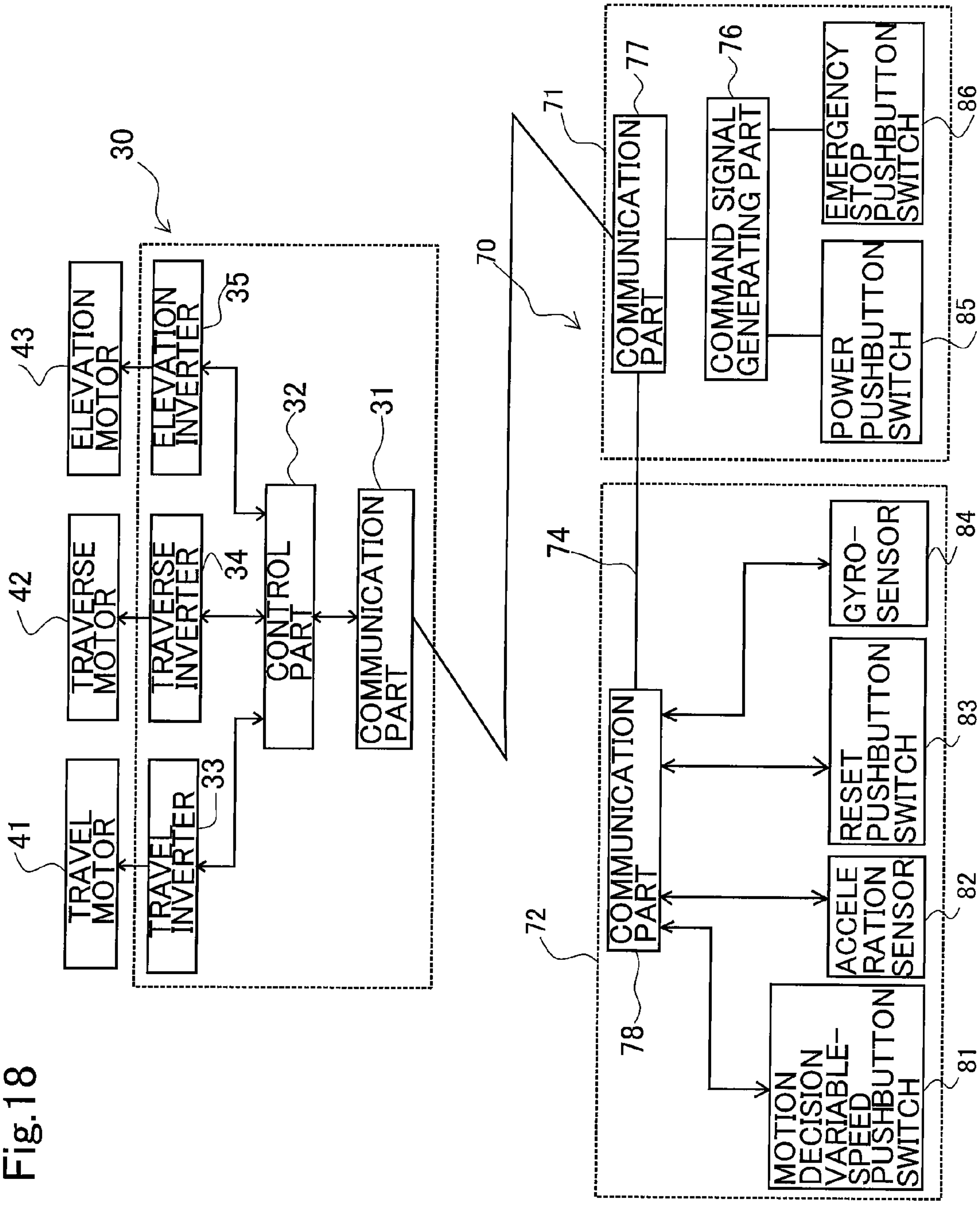
FIG. 18 is a block diagram showing the overall system configuration of a traveling crane operation control apparatus according to the present invention.

FIG. 18 is a block diagram showing the overall system configuration of an operation control apparatus according to the sixth embodiment. As shown in the figure, the base unit 71 worn on the waist comprises a power pushbutton switch 85, an emergency stop pushbutton switch 86, a command signal generating part 76, and a communication part 77. The control unit 72 comprises a motion decision variable-speed pushbutton switch 81, an acceleration sensor 82, a reset pushbutton switch 83, a gyro-sensor 84, and a communication part 78. The operation of the operation control circuit section 70 is the same as that of the operation control circuit section 1 including the base unit 2 and the control unit 3, shown in FIG. 4; therefore, a description thereof is omitted.

Seventh Embodiment

Figure 19:
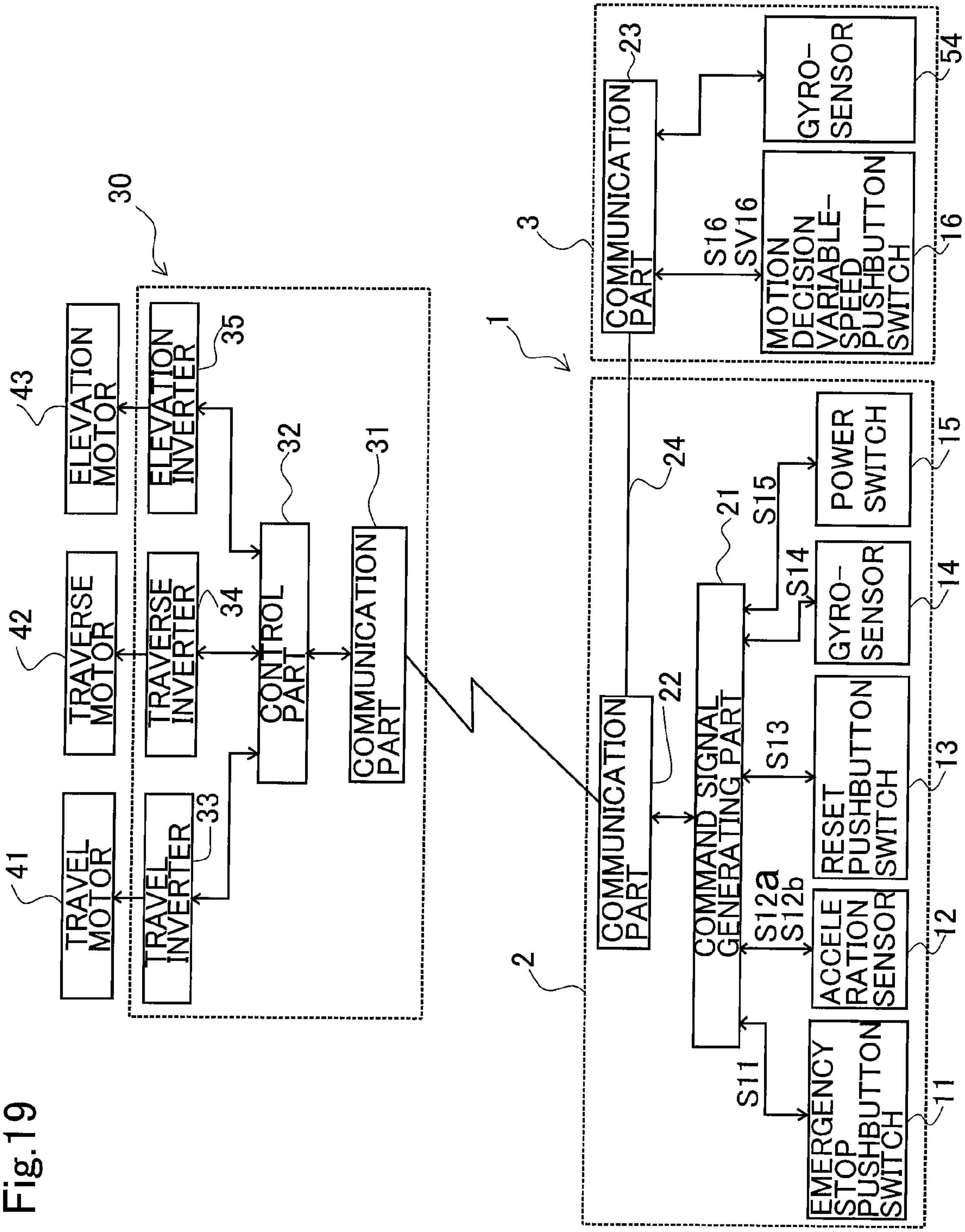
FIG. 19 is a block diagram showing the overall system configuration of a traveling crane operation control apparatus according to the present invention.

FIG. 19 is a block diagram showing the overall system configuration of an operation control apparatus according to a seventh embodiment. The external configuration of the operation control circuit section of the seventh embodiment is substantially the same as that shown in FIG. 3; therefore, a description thereof is omitted. The base unit 2 of the operation control circuit section 1 of this embodiment comprises an emergency stop pushbutton switch 11, an acceleration sensor 12, a reset pushbutton switch 13, a gyro-sensor 14, and a power switch 15. The control unit 3 comprises a motion decision variable-speed pushbutton switch 16 and a gyro-sensor 54.

In the seventh embodiment, the base unit 2 is provided with the gyro-sensor 14, and the control unit 3 is provided with the gyro-sensor 54, as stated above. That is, both the base unit 2 and the control unit 3 are provided with respective gyro-sensors. The operator wears the base unit 2 on the arm 4 and holds the control unit 3 in the hand. When the operator tilts the wrist, the relative angle of the control unit 3 to the arm 4 is detected. The lifting-lowering motion and speed are controlled by using the detected relative angle. More specifically, in receipt of the detected relative angle signal, the command signal generating part 21 generates an elevation command signal and an elevation speed command signal. With this arrangement, the operator can control the lifting-lowering operation without the need to move the arm 4 to a considerable extent. In this regard, however, there is the problem that the tilt angle range of the wrist is small and varies from person to person.

Eighth Embodiment

Figure 20:
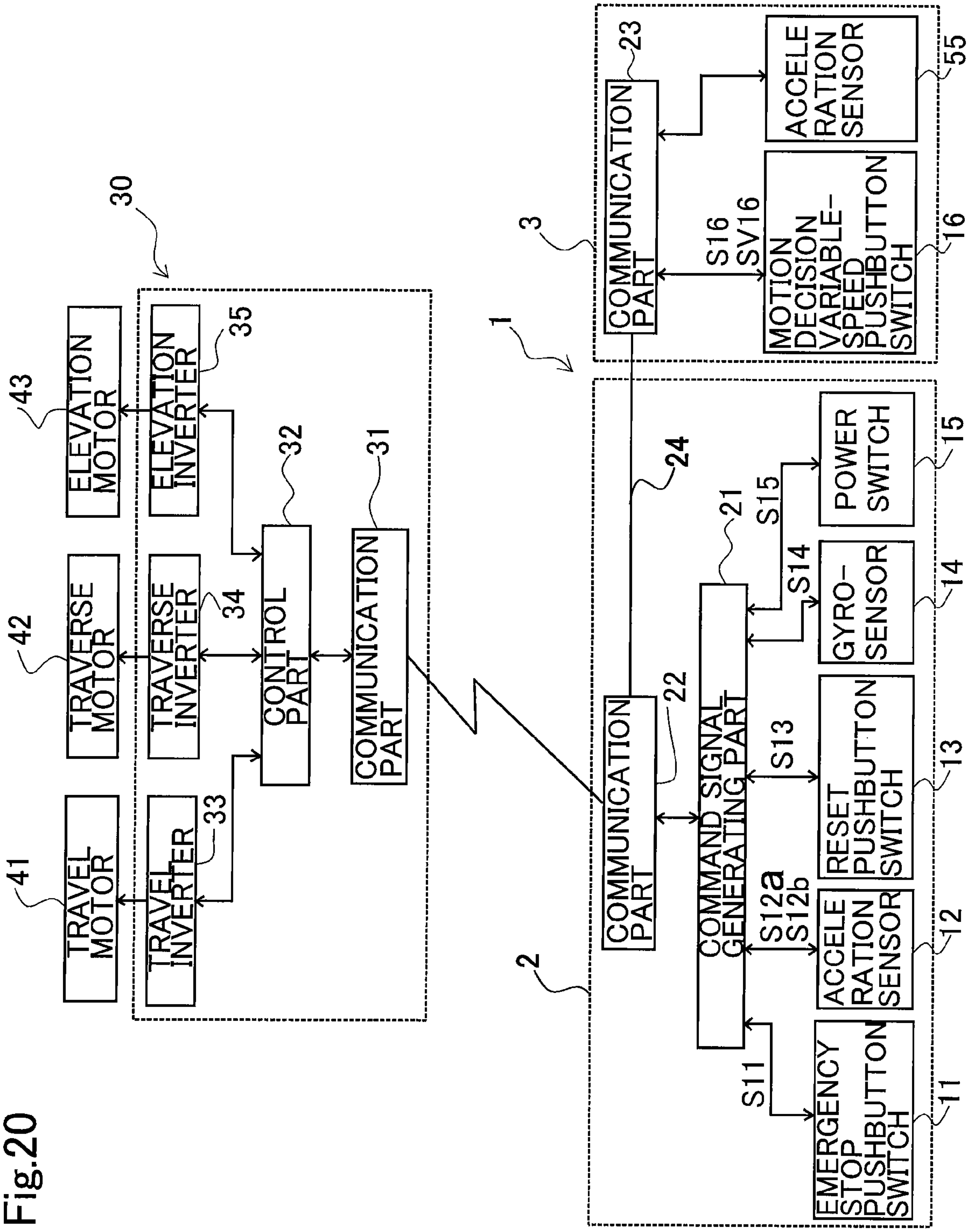
FIG. 20 is a block diagram showing the overall system configuration of a traveling crane operation control apparatus according to the present invention.

FIG. 20 is a block diagram showing the overall system configuration of an operation control apparatus according to an eighth embodiment. The external configuration of the operation control circuit section of the eighth embodiment is substantially the same as that shown in FIG. 3; therefore, a description thereof is omitted. The base unit 2 of the operation control circuit section 1 of this embodiment comprises an emergency stop pushbutton switch 11, an acceleration sensor 12, a reset pushbutton switch 13, a gyro-sensor 14, and a power switch 15. The control unit 3 comprises a motion decision variable-speed pushbutton switch 16 and an acceleration sensor 55.

In the eighth embodiment, the base unit 2 is provided with the acceleration sensor 12, and the control unit 3 is provided with the acceleration sensor 55. That is, both the base unit 2 and the control unit 3 are provided with respective acceleration sensors. The operator wears the base unit 2 on the arm 4 and holds the control unit 3 in the hand. When the operator tilts the wrist, the relative angle of the control unit 3 to the arm 4 is detected. The lifting-lowering motion and speed are controlled by using the detected relative angle. With this arrangement, the operator can control the lifting-lowering operation without the need to move the arm 4 to a considerable extent. However, there is the problem that the tilt angle range of the wrist is small and varies from person to person, as in the case of the seventh embodiment.

Although some embodiments of the present invention have been described above, the present invention is not limited to the foregoing embodiments but can be modified in a variety of ways without departing from the scope of the claims and the technical idea indicated in the specification and the drawings. It should be noted that any shape or material that offers the operation/working-effect of the invention in this application is within the scope of the technical idea of the invention in this application even if it is not directly mentioned in the specification or the drawings. For example, although an acceleration sensor is used as the tilt direction and angle detecting means, the tilt direction and angle detecting means is not limited to the acceleration sensor but may be any means capable of detecting the tilt direction and tilt angle of the control box.

In the sixth embodiment, the lifting-lowering speed may be controlled by detecting the angle of the control unit 3 held in the hand relative to a horizontal plane (i.e. by detecting the tilt angle of the wrist).

In the first embodiment, the lifting-lowering motion and speed may be controlled by detecting the tilt angle of the base unit 2 worn on the arm 4 relative to a horizontal plane.

INDUSTRIAL APPLICABILITY

The operation control circuit section comprises a base unit worn on a body part, e.g. an arm, and a control unit provided with a minimum number of pushbutton switches, including a variable-speed pushbutton switch, necessary for operation control. Thus, the present invention is applicable to operating a traveling crane in any desired direction among vertical and horizontal directions at any desired speed without the need to gaze at the control unit by a simple operation in which the operator points the base unit in a direction in which the traveling crane is desired to be moved and in a vertical direction in which the traveling crane is desired to be lifted or lowered, and actuates the control unit.

LIST OF REFERENCE SIGNS

1: operation control circuit section
2: base unit
3: control unit
4: arm
5: arm belt
11: emergency stop pushbutton switch
12: acceleration sensor
13: reset pushbutton switch
14: gyro-sensor
15: power switch
16: motion decision variable-speed pushbutton switch
17: elevation trigger pushbutton switch
21: command signal generating part
22: communication part
23: communication part
24: communication cable
30: motor drive control circuit section
31: communication part
32: control part
33: travel inverter
34: traverse inverter
35: elevation inverter
41: travel motor
42: traverse motor
43: elevation motor
51: travel-traverse decision variable-speed pushbutton switch
52: lifting decision pushbutton switch
53: lowering decision pushbutton switch
54: gyro-sensor
55: acceleration sensor
56: lifting-lowering decision variable-speed pushbutton switch
60: hand
61: forefinger
62: thumb
70: operation control circuit section
71: base unit
72: control unit
73: wearing belt
76: command signal generating part
77: communication part
78: communication part
81: motion decision variable-speed pushbutton switch
82: acceleration sensor
83: reset pushbutton switch
84: gyro-sensor
85: power pushbutton switch
86: emergency stop pushbutton switch

The invention claimed is:

1. A traveling crane operation control apparatus for a traveling crane having travel rails laid in a predetermined direction in a horizontal plane, a traverse rail disposed in a direction perpendicular to said travel rails and moved along said travel rails by a travel motor, and an electric hoist having a traverse motor for moving along said traverse rail and an elevation motor for lifting and lowering a load, said traveling crane operation control apparatus comprising:

an operation control circuit section including a base unit wearable on an arm of an operator and a control unit operable by a hand of the arm wearing said base unit;

said base unit having base unit tilt detecting means detecting a vertical tilt direction and tilt angle of said base unit in a vertical plane, base unit direction detecting means detecting a direction in which said base unit points in a horizontal plane, and command signal generating means generating a travel command signal and a travel speed command signal for said travel motor, a traverse command signal and a traverse speed command signal for said traverse motor, and an elevation command signal and an elevation speed command signal for said elevation motor;

said control unit having at least motion decision means outputting a motion decision signal to the command signal generating means of said base unit;

wherein, said command signal generating means has the following functions A, B, and C:

A. a function of generating the travel command signal and the travel speed command signal, and the traverse command signal and the traverse speed command signal according to a detection signal from said base unit direction detecting means when the operator is pointing the arm wearing said base unit in a direction for movement of said traveling crane in the horizontal plane and when the motion decision signal is output from said motion decision means;

B. a function of generating the elevation command signal and the elevation speed command signal according to a detection signal from said base unit tilt detecting means when the operator is pointing the arm wearing said base unit in a vertical direction for lifting or lowering of the load by said electric hoist and when the motion decision signal is output from said motion decision means; and C. a function of generating the elevation command signal and the elevation speed command signal, the travel command signal and the travel speed command signal, and the traverse command signal and the traverse speed command signal according to detection signals from said base unit direction detecting means and said base unit tilt detecting means when the operator is pointing the arm wearing said base unit in a direction for movement of said traveling crane in the horizontal plane and in a vertical direction for lifting or lowering of the load by said electric hoist and when the motion decision signal is output from said motion decision means.

2. The traveling crane operation control apparatus of claim 1, wherein the motion decision means of said control unit has a speed signal output function to output a speed signal designating a speed in addition to said motion decision signal;

said command signal generating means having a function to generate the travel speed command signal and the traverse speed command signal for moving the traveling crane in said moving direction and the elevation speed command signal for lifting or lowering the traveling crane according to the speed signal from said speed signal output function.

3. The traveling crane operation control apparatus of claim 1, wherein the motion decision means of said control unit has a speed signal output function to output a speed signal designating a speed in addition to said motion decision signal, said command signal generating means divides a vertical tilt angle range of said arm into a first tilt angle range, a second tilt angle range, and a third tilt angle range, wherein any angle within said first tilt angle range is less than any angle within said second tilt angle range, and any angle within said second tilt angle range is less than any angle within said third tilt angle range, and said command signal generating means has the following first, second and third functions according to a range of the vertical tilt angle detected by said base unit tilt detecting means:

a first function with which when the vertical tilt angle detected is in said first tilt angle range, the command signal generating means generates the travel command signal and the traverse command signal for moving the traveling crane in the direction detected by said base unit direction detecting means and also generates the travel speed command signal and the traverse speed command signal according to the speed signal output from the speed signal output function of said control unit;

a second function with which when the vertical tilt angle detected is in said second tilt angle range, the command signal generating means generates the travel command signal and the traverse command signal for moving the traveling crane in the direction detected by said base unit direction detecting means and generates the elevation command signal for lifting or lowering the load in the vertical direction detected by said base unit tilt detecting means and further generates the travel speed command signal, the traverse speed command signal and the elevation speed command signal according to the speed signal output from the speed signal output function of said control unit; and a third function with which when the vertical tilt angle detected is in said third tilt angle range, the command signal generating means generates the elevation command signal for lifting or lowering the load in the vertical direction detected by said base unit tilt detecting means and also generates the elevation speed command signal according to the speed signal output from the speed signal output function of said control unit.

4. The traveling crane operation control apparatus of claim 3, wherein said first tilt angle range is from 0° to 15°, said second tilt angle range is from 15° to 60°, and said third tilt angle range is from 60° to 90°.

5. The traveling crane operation control apparatus of claim 1, wherein the motion decision means of said control unit has a speed signal output function to output a speed signal designating a speed in addition to said motion decision signal;

said command signal generating means divides a vertical tilt angle range of said arm into a first tilt angle range, a second tilt angle range, and a third tilt angle range, wherein any angle within said first tilt angle range is less than any angle within said second tilt angle range, any angle within said second tilt angle range is less than any angle within said third tilt angle range, and said command signal generating means has the following first, second, and third functions according to a range of the vertical tilt angle detected by said base unit tilt direction detecting means:

a first function with which when the vertical tilt angle detected is in said first tilt angle range, the command signal generating means generates the travel command signal and the traverse command signal for moving the traveling crane in the direction detected by said base unit direction detecting means and also generates the travel speed command signal and the traverse speed command signal according to the speed signal output from the speed signal output function of said control unit;

a second function with which when the vertical tilt angle detected is in said second tilt angle range, the command signal generating means does not generate any of the travel command signal, the travel speed command signal, the traverse command signal, the traverse speed command signal, the elevation command signal and elevation speed command signal; and a third function with which when the vertical tilt angle detected is in said third tilt angle range, the command signal generating means generates the elevation command signal for lifting or lowering the load in the vertical direction detected by said base unit tilt detecting means and also generates the elevation speed command signal according to the speed signal output from the speed signal output function of said control unit.

6. The traveling crane operation control apparatus of claim 5, wherein said first tilt angle range is from 0° to 30°, said second tilt angle range is from 30° to 45°, and said third tilt angle range is from 45° to 90°.

7. The traveling crane operation control apparatus of claim 1, wherein the motion decision means of said control unit has a speed signal output function to output a speed signal designating a speed in addition to said motion decision signal and also has an elevation trigger signal output function to output an elevation trigger signal;

said command signal generating means having the following first, second and third functions:

a first function with which the command signal generating means generates the travel command signal and the traverse command signal for moving the traveling crane in the direction detected by said base unit direction detecting means and also generates the travel speed command signal and the traverse speed command signal according to the speed signal output from the speed signal output function of said control unit;

a second function with which the command signal generating means generates the elevation command signal in response to the elevation trigger signal from the elevation trigger signal output function of said control unit and also generates an elevation speed command signal according to the vertical tilt angle detected by said base unit tilt detecting means;

a third function with which the command signal generating means generates the travel command signal and the traverse command signal for moving the traveling crane in the direction detected by said base unit direction detecting means, generates the travel speed command signal and the traverse speed command signal according to the speed signal output from the speed signal output function of said control unit, outputs the elevation command signal in response to the elevation trigger signal from the elevation trigger signal output function of said control unit and further generates the elevation speed command signal according to the vertical tilt angle detected by said base unit tilt detecting means.

8. The traveling crane operation control apparatus of claim 1, wherein said control unit is provided with a control unit direction detecting means detecting a direction in which said control unit points in a horizontal plane or a control unit tilt detecting means detecting a vertical tilt direction and tilt angle of said control unit in a vertical plane to detect a relative angle of a wrist to the arm wearing said base unit, said command signal generating means generating the elevation command signal and the elevation speed command signal according to said relative angle detected.

9. A traveling crane operation control apparatus for a traveling crane having travel rails laid in a predetermined direction in a horizontal plane, a traverse rail disposed in a direction perpendicular to said travel rails and moved along said travel rails by a travel motor, and an electric hoist having a traverse motor for moving along said traverse rail and an elevation motor for lifting and lowering a load, said traveling crane operation control apparatus comprising:

an operation control circuit section including a base unit wearable on an arm of an operator and a control unit wearable on a finger of the arm wearing said base unit;

said base unit having base unit direction detecting means detecting a direction in which said base unit points in the horizontal plane, and command signal generating means generating a travel command signal and a travel speed command signal for said travel motor, a traverse command signal and a traverse speed command signal for said traverse motor, and an elevation command signal and an elevation speed command signal for said elevation motor;

said control unit having motion decision and speed setting means operable by a finger other than the finger wearing said control unit and outputting a travel-traverse decision signal and a speed signal designating a speed to the command signal generating means of said base unit, and lifting-lowering decision means outputting an lifting-lowering decision signal to the command signal generating means of said base unit;

said command signal generating means having the following first and second functions:

a first function of generating the travel command signal and the traverse command signal for moving the traveling crane in the direction detected by said base unit direction detecting means and also generating the travel speed command signal and the traverse speed command signal according to said speed signal when the operator is pointing the arm wearing said base unit in a direction for movement of said traveling crane in the horizontal plane and when the travel-traverse decision signal is output from said motion decision and speed setting means; and a second function of generating the elevation command signal and the constant-speed elevation speed command signal when the lifting-lowering decision signal is output from the lifting-lowering decision means.

10. The traveling crane operation control apparatus of claim 9, wherein said base unit has base unit tilt detecting means detecting a vertical tilt direction and angle of said base unit in a vertical plane;

said command signal generating means having the following third function:

a third function with which the command signal generating means outputs the elevation command signal and the elevation speed command signal designating a speed corresponding to the tilt angle detected by said base unit tilt detecting means on condition that there is the lifting-lowering decision signal from said lifting-lowering decision means.

11. A traveling crane operation control apparatus for a traveling crane having travel rails laid in a predetermined direction in a horizontal plane, a traverse rail disposed in a direction perpendicular to said travel rails and moved along said travel rails by a travel motor, and an electric hoist having a traverse motor for moving along said traverse rail and an elevation motor for lifting and lowering a load, said traveling crane operation control apparatus comprising:

7an operation control circuit section including a base unit wearable on a body part of an operator other than an arm of the operator and a control unit operable by a hand of the operator;

said control unit having control unit tilt detecting means detecting a vertical tilt direction and tilt angle of said control unit in a vertical plane, a control unit direction detecting means detecting a direction in which said control unit points in the horizontal plane, and motion decision and speed setting means outputting a motion decision signal and a speed signal;

said base unit having command signal generating means generating a travel command signal and a travel speed command signal for said travel motor, a traverse command signal and a traverse speed command signal for said traverse motor, and an elevation command signal and an elevation speed command signal for said elevation motor;

said command signal generating means of said base unit classifying the tilt angle detected by said control unit tilt detecting means into one of three tilt angle ranges and having the following first, second and third functions;

a first function of generating the travel command signal and the traverse command signal, and speed command signals respectively associated with;

said command signals when the tilt angle detected by said tilt detecting means is in said first tilt angle range and when the motion decision signal is output from said motion decision and speed setting means;

a second function of generating the travel command signal, the traverse command signal, and the lifting or lowering command signal according to whether the tilt direction of said control unit is upward or downward, and also generating speed command signals respectively associated with said command signals when the tilt angle detected by said tilt detecting means is in said second tilt angle range and when the motion decision signal is output from said motion decision and speed setting means; and a third function of generating the lifting or lowering command signal according to whether the pointing direction of the control unit is upward or downward, and also generating a speed command signal associated with said lifting or lowering command signal when the tilt angle detected by said tilt detecting means is in said third tilt angle range and when the motion decision signal is output from said motion decision and speed setting means.

12. The traveling crane operation control apparatus of claim 11, wherein said command signal generating means generates speed command signals respectively associated with the travel command signal and the traverse command signal for said first tilt range according to the speed signal from said motion decision and speed setting means, generates speed command signals respectively associated with the travel command signal and the traverse command signal for said second tilt range according to the speed signal from said motion decision and speed setting means, generates the speed command signal associated with the lifting or lowering command signal for said second tilt range according to the tilt angle detected by said control unit tilt detecting means, and generates the speed command signal associated with the lifting or lowering command signal for said third tilt range according to the speed signal from said motion decision and speed setting means.

13. The traveling crane operation control apparatus of claim 11, wherein said first tilt angle range is from 0° to 15°, said second tilt angle range is from 15° to 60°, and said third tilt angle range is from 60° to 90°.

14. A traveling crane operation control method for a traveling crane having travel rails laid in a predetermined direction in a horizontal plane, a traverse rail disposed in a direction perpendicular to said travel rails and moved along said travel rails by a travel motor, and an electric hoist having a traverse motor for moving along said traverse rail and an elevation motor for lifting and lowering a load, said traveling crane operation control method comprising:

the following steps by an operator:

a step of wearing, on a body of the operator, a base unit including tilt detecting means detecting a vertical tilt direction in a vertical plane and direction detecting means detecting a direction in the horizontal plane;

a step of pointing said base unit in a direction for movement of the traveling crane the horizontal plane, or in a direction for lifting or lowering of the load in the vertical plane, or in both said directions for movement and lifting or lowering; and a step of operating a hand-operated control unit with a hand of the operator, thereby moving said traveling crane only in said direction, for movement of the traveling crane in which the operator is pointing said base unit, lifting or lowering the load by said electric hoist only in said direction for lifting or lowering of the load in which the operator is pointing said base unit, or conducting both the movement and the lifting or lowering only in said directions for movement and lifting or lowering, in which the operator is pointing said base unit, simultaneously.

* * * * *